US009316799B2

(12) United States Patent
Shiraishi

(10) Patent No.: US 9,316,799 B2
(45) Date of Patent: Apr. 19, 2016

(54) OPTICAL MODULE AND FABRICATION METHOD

(71) Applicant: FUJITSU LIMITED, Kawasaki-shi, Kanagawa (JP)

(72) Inventor: Takashi Shiraishi, Isehara (JP)

(73) Assignee: FUJITSU LIMITED, Kawasaki (JP)

( * ) Notice: Subject to any disclaimer, the term of this patent is extended or adjusted under 35 U.S.C. 154(b) by 312 days.

(21) Appl. No.: 14/016,603

(22) Filed: Sep. 3, 2013

(65) Prior Publication Data

US 2014/0140657 A1  May 22, 2014

(30) Foreign Application Priority Data

Nov. 20, 2012  (JP) ................................ 2012-254714

(51) Int. Cl.
*G02B 6/42* (2006.01)
(52) U.S. Cl.
CPC ............. *G02B 6/42* (2013.01); *Y10T 156/1089* (2015.01)
(58) Field of Classification Search
None
See application file for complete search history.

(56) References Cited

U.S. PATENT DOCUMENTS 7,630,594 B2 * 12/2009 Lee ...................... G02B 6/4204
385/14

8,774,576 B2 * 7/2014 Shiraishi ................. G02B 6/42
385/14
2011/0242435 A1  10/2011 Mouri
2012/0076454 A1   3/2012 Shiraishi

FOREIGN PATENT DOCUMENTS

| CN | 102257313 | 11/2011 |
|---|---|---|
| JP | 2012-068539 | 4/2012 |
| JP | 2012-108326 | 6/2012 |
| WO | WO2012-067761 | 5/2012 |

OTHER PUBLICATIONS

CNOA—Office Action of Chinese Patent Application No. 201310460470.1 dated Feb. 6, 2015, with partial English translation of the Office Action.

* cited by examiner

*Primary Examiner* — John M Bedtelyon
(74) *Attorney, Agent, or Firm* — Fujitsu Patent Center

(57) ABSTRACT

An optical module includes a flexible printed circuit board on which a light receiving element and/or a light emitting element is mounted face-down as an optical element, and having a part that transmits incoming light to the light receiving element and/or outgoing light from the light emitting element; a lens member disposed on a surface of the printed circuit board, on which the optical element is not mounted, and integrally formed to have within a predetermined area, a lens that transmits the incoming and/or the outgoing light, and a convex part abutting the printed circuit board; a bonding member disposed in an area other than the predetermined area, between the printed circuit board and the lens member, and that bonds the printed circuit board and the lens member; and a cooling member disposed to apply pressure to the optical element toward the printed circuit board and cool the optical element.

10 Claims, 22 Drawing Sheets

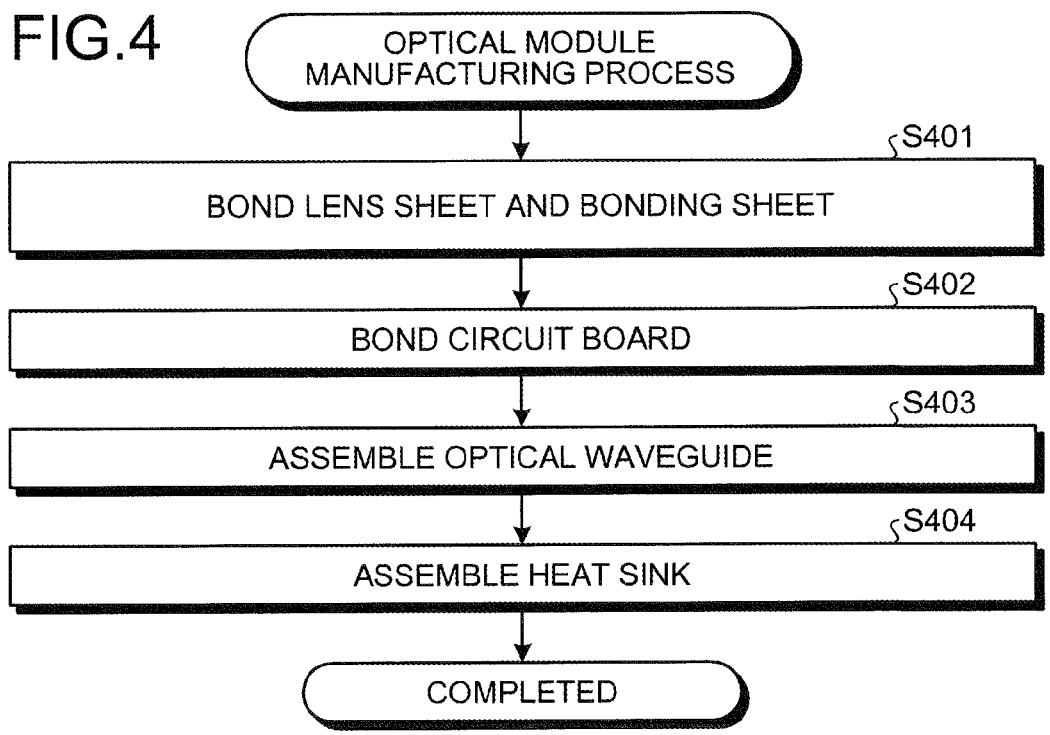

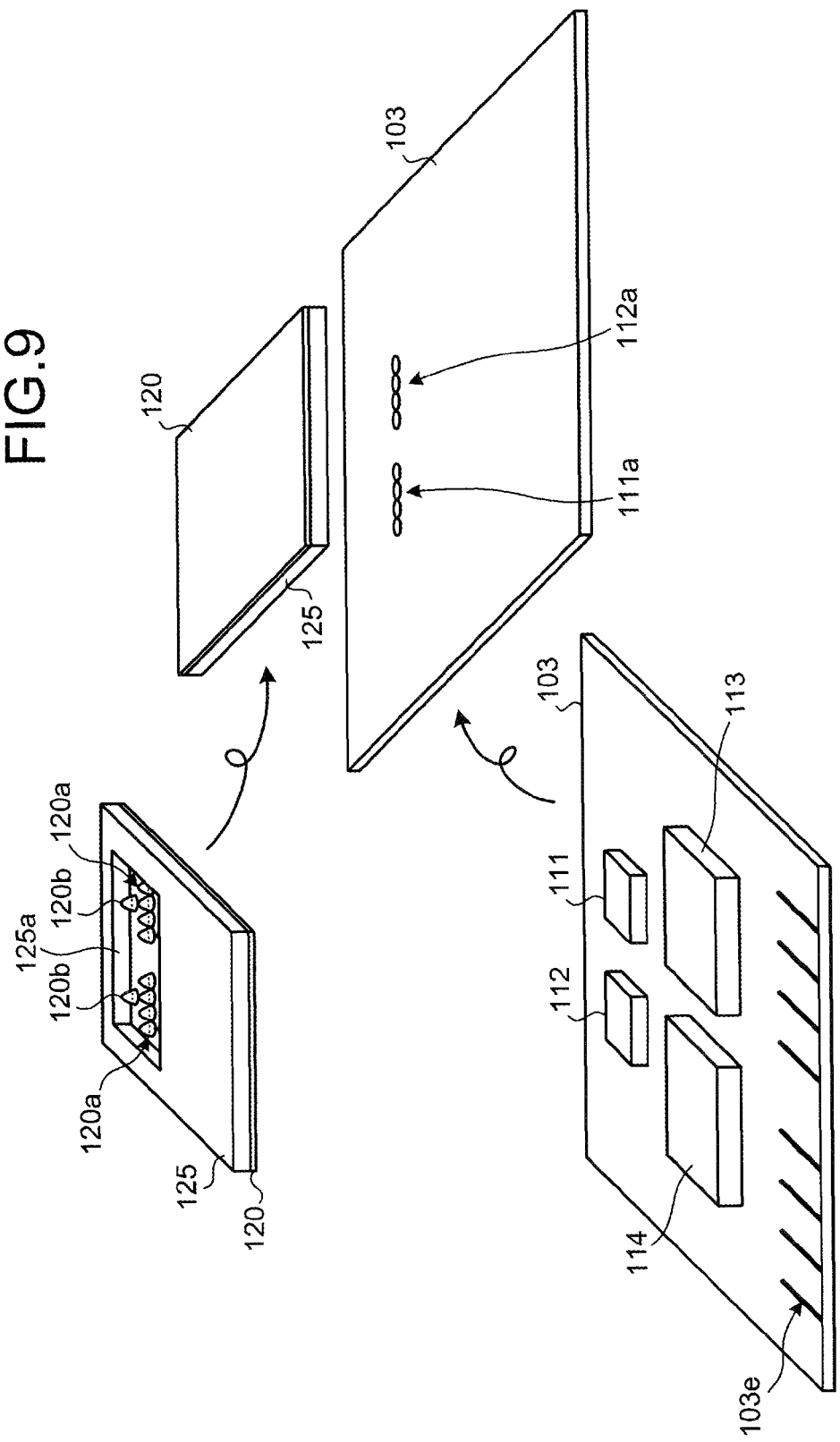

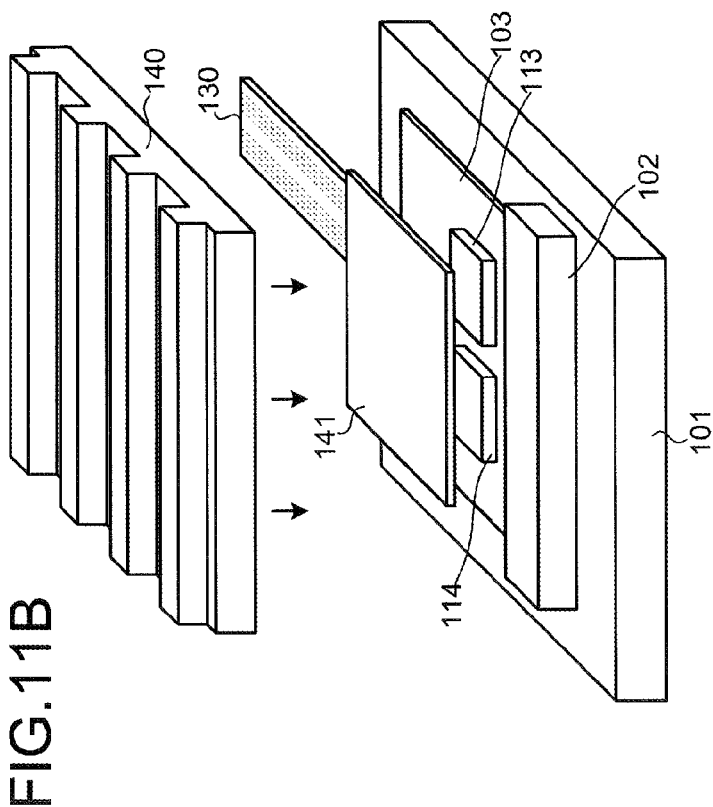
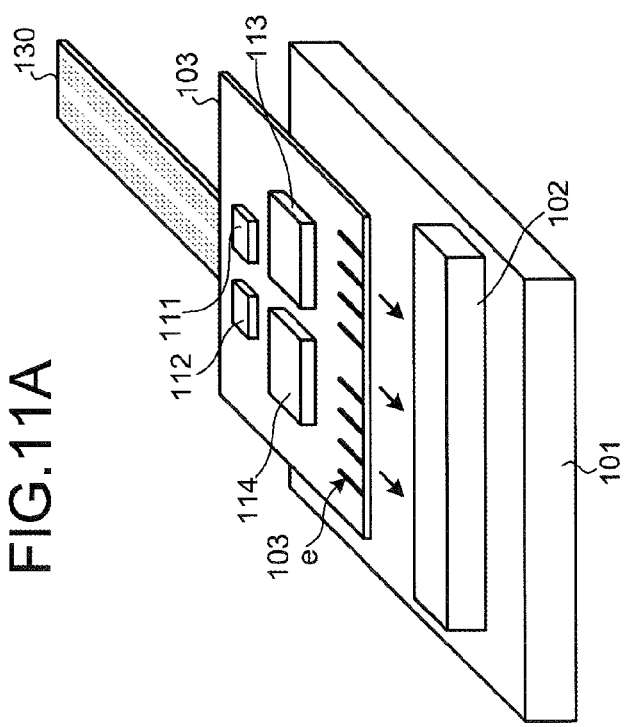

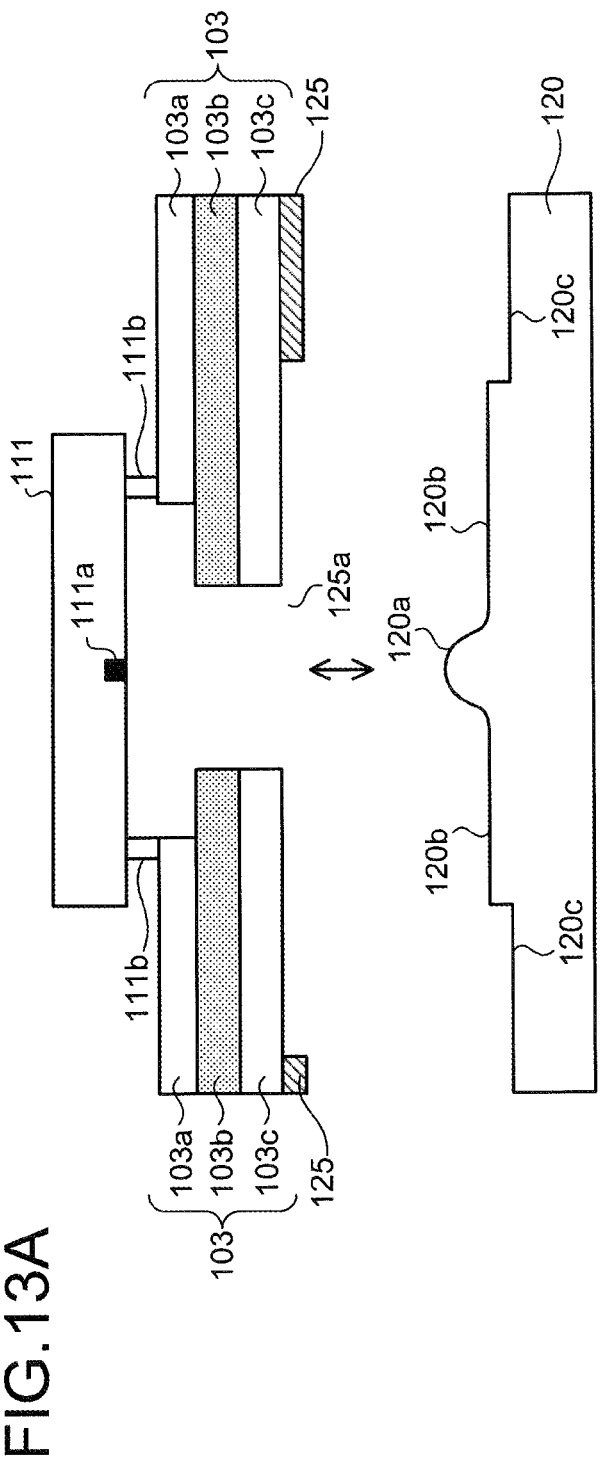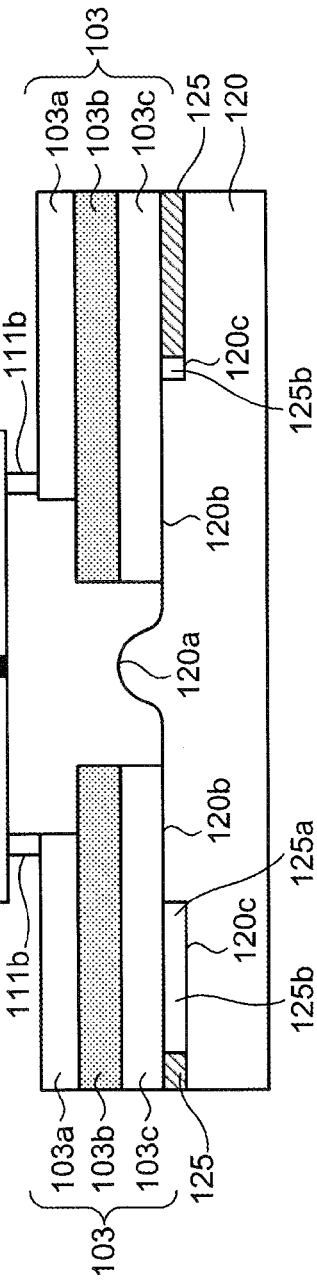

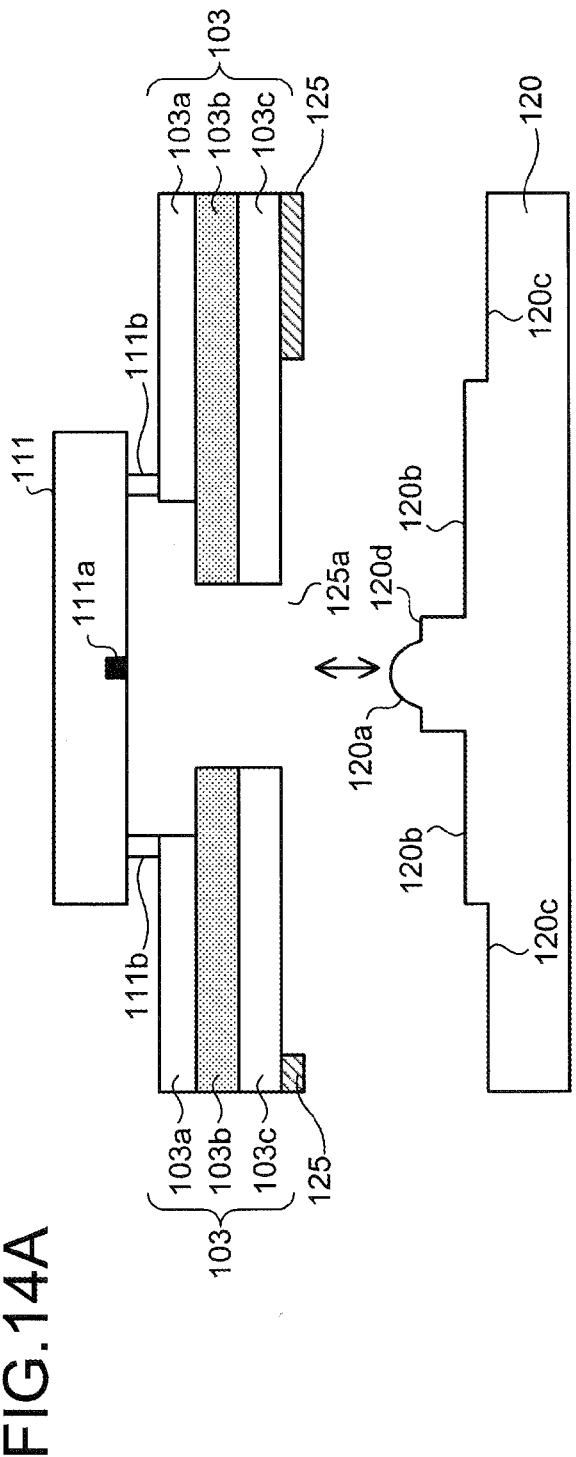
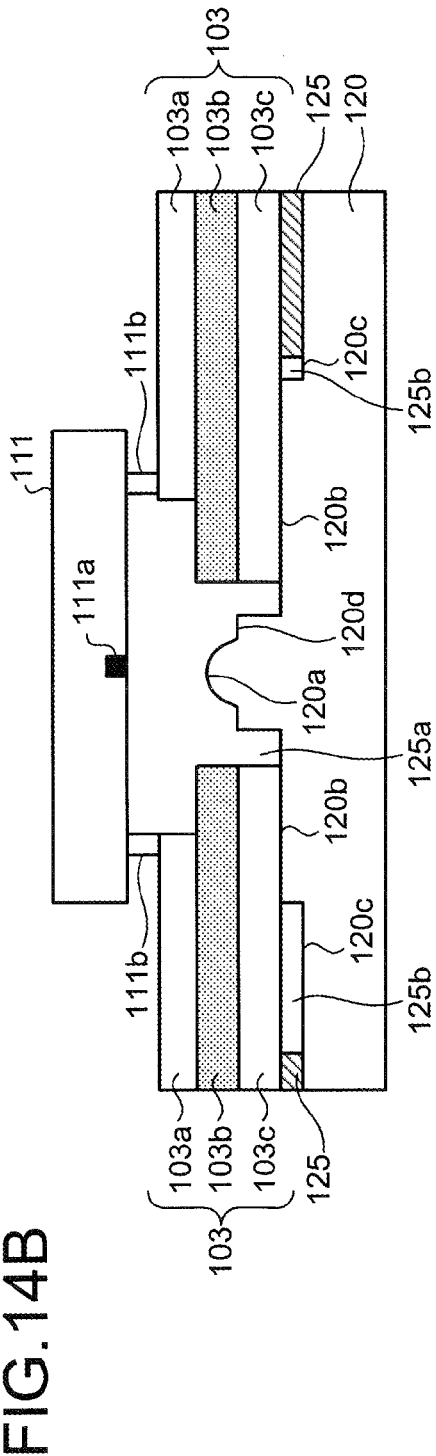
FIG.14A
FIG.14B

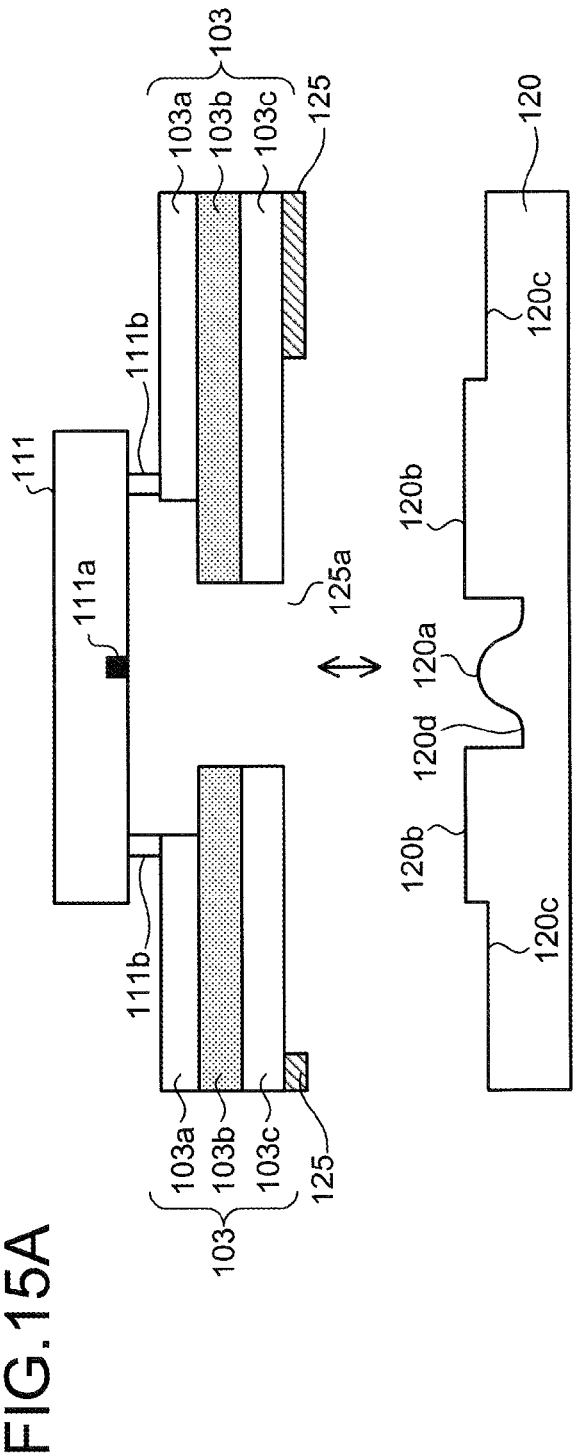
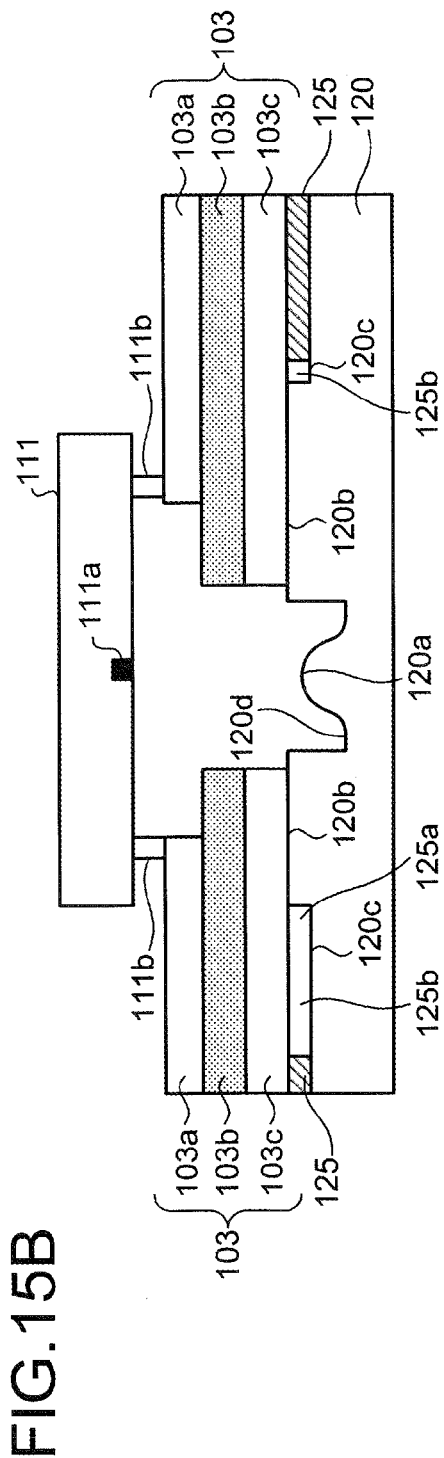

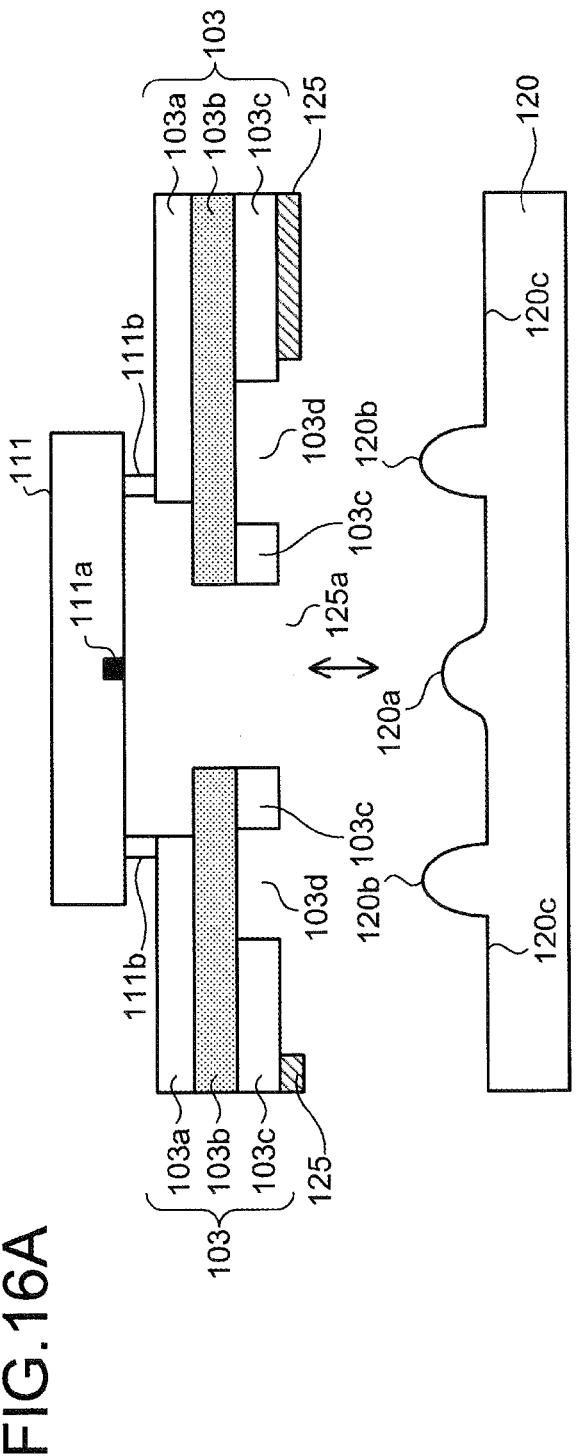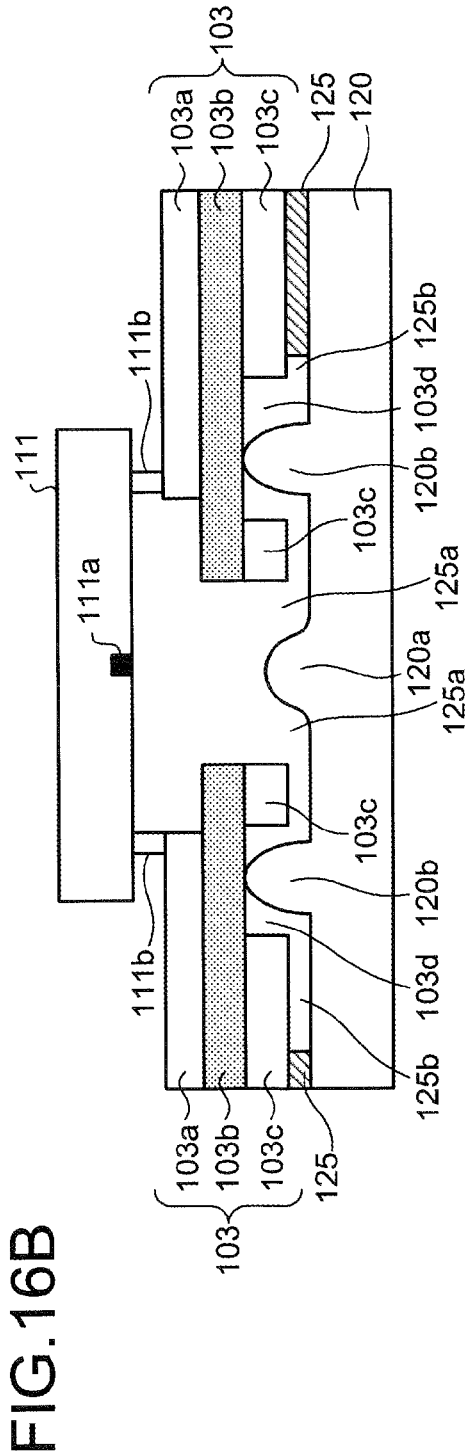
FIG.16A
FIG.16B

OPTICAL MODULE AND FABRICATION METHOD

CROSS REFERENCE TO RELATED APPLICATIONS

This application is based upon and claims the benefit of priority of the prior Japanese Patent Application No. 2012-254714, filed on Nov. 20, 2012, the entire contents of which are incorporated herein by reference.

FIELD

The embodiments discussed herein are related an optical module and a fabrication method thereof.

BACKGROUND

Recently, in the field of servers and high-end computers, there has been a dramatic increase in transmission capacity of an I/O function of communication between a central processing unit (CPU) and an external interface, due to enhanced performance by multiple CPUs. On the other hand, in light of problems of crosstalk and wiring density with a conventional electrical high-speed transmission, a study is under way of an optical interconnect technology of arranging an optoelectric conversion element and using an optical signal for a high-speed I/O.

For the optical interconnect technology, a small optical module is in demand that is several times as small as the optical module for the conventional backbone optical communication and that can be fabricated at a low cost. With respect to such an optical module, the one with a light emitting element and a light receiving element mounted face-down to a substrate is known. This optical module has the light emitting element and the light receiving element mounted face-down to the substrate transmitting the light and performs the optical communication with an optical waveguide formed beneath the substrate.

As to a configuration enabling production at a lower cost, the optical module is known that has the light receiving element or the light emitting element mounted face-down to flexible printed circuits (FPC) board made of a polyimide, etc., thin film (see, e.g., Japanese Laid-Open Patent Publication No. 2012-068539).

In such an optical module, for example, a lens sheet with a lens formed on a surface thereof is disposed, by way of a bonding sheet, on the lower surface of the flexible printed circuit board to which the optical elements are flip-chip-mounted and further, the optical waveguide is disposed beneath the lens sheet. For example, to suppress deterioration of characteristics due to the temperature rise of the optical elements, a heat sink is disposed on the upper side of the optical elements, in close contact with the optical elements and the flexible printed circuit board is held by pressure from the heat sink.

In the conventional technology described above, however, between the flexible printed circuit board and the lens sheet, a void is formed in which the bonding sheet does not intervene to secure a light path and the pressure from the heat sink causes the flexible printed circuit board to warp, arising in a problem that the optical elements are misaligned with respect to the lens.

SUMMARY

According to an aspect of an embodiment, an optical module includes a flexible printed circuit board on which at least any one among a light receiving element and a light emitting element is mounted face-down as an optical element, and that has a part that when the light receiving element is mounted, transmits incoming light to the light receiving element and when the light emitting element is mounted, transmits outgoing light from the light emitting element; a lens member that is disposed on the flexible printed circuit board, on a surface on which the optical element is not mounted, the lens member is integrally formed to have within a predetermined area, a lens that transmits at least any one among the incoming light and the outgoing light, and a convex part that abuts the flexible printed circuit board; a bonding member that is disposed in an area other than the predetermined area, between the flexible printed circuit board and the lens member, and that bonds the flexible printed circuit board and the lens member; and a cooling member that is disposed in a state that applies pressure to the optical element toward the flexible printed circuit board and cools the optical element.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 4 is a process flowchart of one example of a fabrication process of the optical module, using a flip-chip bonder;

FIG. 9 is an explanatory diagram of one example of a process of bonding a flexible board;

FIGS. 11A and 11B are explanatory diagrams of one example of a process of mounting a heat sink;

FIGS. 13A and 13B are explanatory diagrams of variation 1 of the embodiment;

FIGS. 14A and 14B are explanatory diagrams of variation 2 of the embodiment;

FIGS. 15A and 15B are explanatory diagrams of variation 3 of the embodiment;

FIGS. 16A and 16B are explanatory diagrams of variation 4 of the embodiment;

DESCRIPTION OF EMBODIMENTS

Preferred embodiments will be described in detail with reference to the accompanying drawings.

Figure 1:
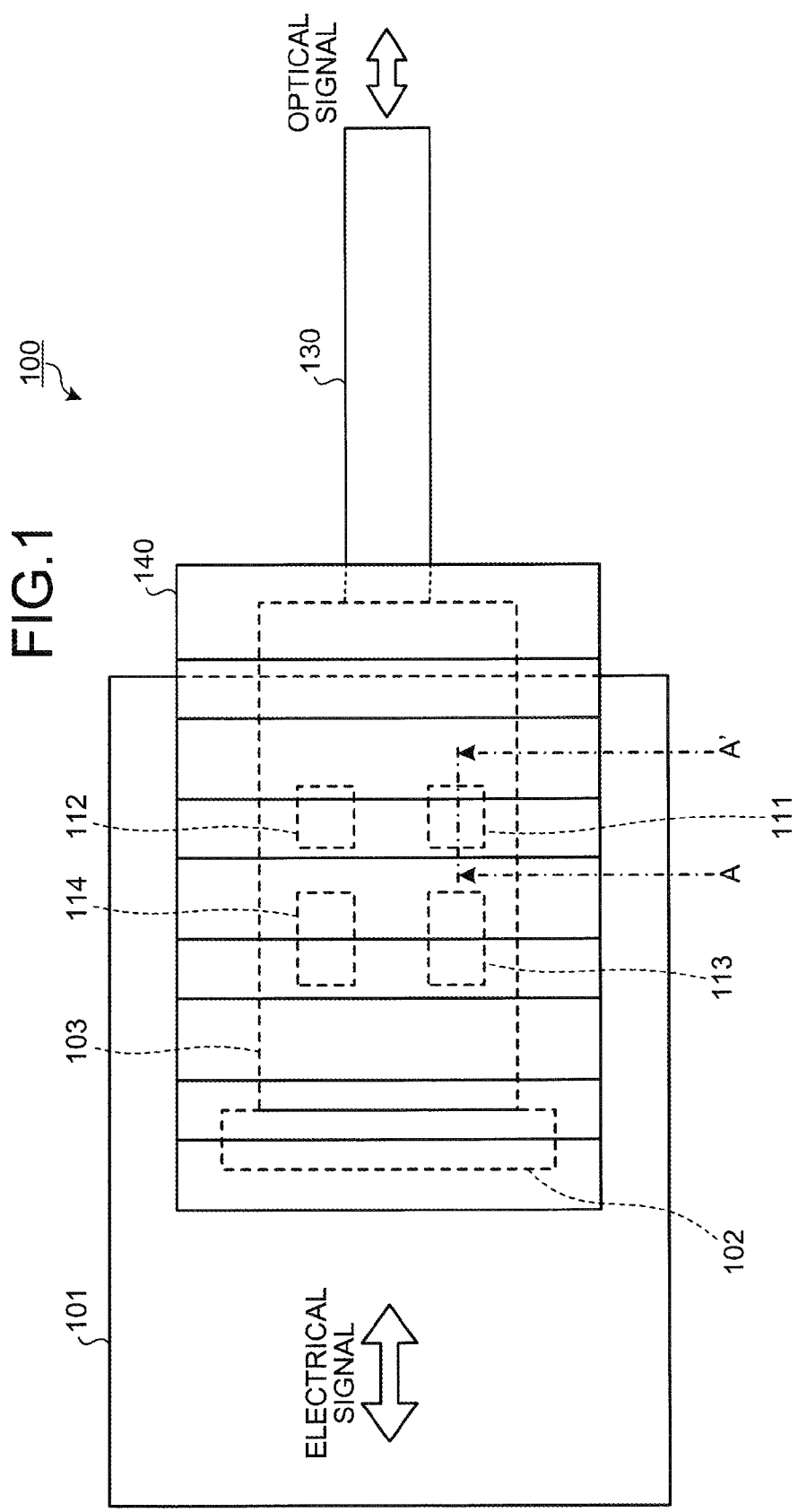
FIG. 1 is a top view of one example of a configuration of an optical module according to an embodiment.
Figure 2:
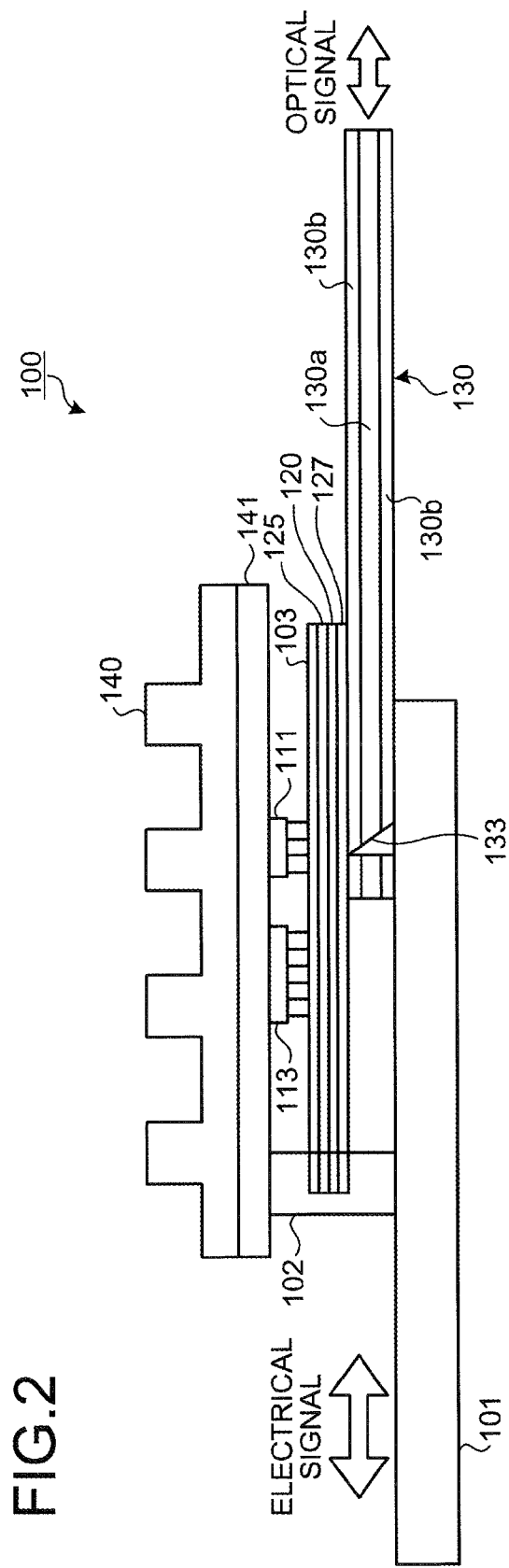
FIG. 2 is a side view of the optical module according to the embodiment.

FIG. 1 is a top view of one example of a configuration of an optical module according to an embodiment. FIG. 2 is a side view of the optical module according to the embodiment. As depicted in FIGS. 1 and 2, an optical module 100 has a printed circuit board 101, a flexible printed circuits (FPC) board 103, an optical waveguide 130, and a heat sink 140. The flexible printed circuit board is hereinafter referred to as a flexible board.

The printed circuit board 101 is a printed circuit board that transmits electrical signals. The printed circuit board 101 has an electric connector 102 disposed to connect the printed circuit board 101 and the flexible board 103. The flexible board 103 is flexible and has a core layer having a film of polyimide, etc., and, on each surface thereof, an electrode layer with patterning.

A light receiving element 111 and a light emitting element 112 are mounted face-down to the upper surface of the flexible board 103. Being mounted face-down indicates that a light receiving part 111a (see FIG. 3) of the light receiving element 111 or a light emitting part 112a (see FIG. 9) of the light emitting element 112 is so disposed as to face the flexible board 103. While this embodiment employs the optical module to which both of the light receiving element 111 and the light emitting element 112 are mounted, the optical module may be one to which either one is mounted (see, for example, FIGS. 19 and 20).

The light receiving element 111 and the light emitting element 112 can be mounted face-down by a general method of element mounting such as a flip-chip bonder. For the light receiving element 111, for example, a photodiode (PD) array can be used. For the light emitting element 112, for example, a vertical cavity semiconductor emission laser (VCSEL) array can be used.

A trans-impedance amplifier (TIA) 113 is arranged on the flexible board 103. The TIA 113 converts a current from the light receiving element 111 to a voltage. A driver IC 114 is arranged on the flexible board 103. The driver IC 114 drives the light emitting element 112 by supplying a drive current to the light emitting element 112. The TIA 113 and the driver IC 114 are electrically connected to the printed circuit board 101 by way of the flexible board 103 and the electric connector 102.

Further, on the upper surface of the light receiving element 111 and the light emitting element 112 disposed on the flexible board 103, the heat sink 140 is disposed, with a heat dissipating sheet 141 sandwiched in between. The heat dissipating sheet 141 is in close contact with the light receiving element 111 and the light emitting element 112 to enhance heat dissipation of the light receiving element 111 and the light emitting element 112. While the heat dissipating sheet 141 is used in this embodiment, heat dissipating grease can be used in place of the heat dissipating sheet 141.

The heat sink 140 cools the light receiving element 111 and the light emitting element 112 by way of the heat dissipating sheet 141. The heat sink 140, for example, by being fastened to the flexible board 103 by clamps, screws, etc., is held in a state applying pressure to the light receiving element 111 and the light emitting element 112. While the heat sink 140 is used for the cooling of the light receiving element 111 and the light emitting element 112, a cooling means is not limited hereto and, for example, a Peltier element, etc., may be used to cool the light receiving element 111 and the light emitting element 112 in close contact therewith (applying pressure thereto).

A lens sheet 120 is bonded to the back surface of the flexible board 103, with a bonding sheet 125 sandwiched in between. For the lens sheet 120, a transparent material is used and a condensing lens 120a (see FIG. 3) is formed as a part thereof. The optical waveguide 130 is connected to the lower face of the lens sheet 120 by way of a bonding layer 127.

The optical waveguide 130 is a polymer waveguide and transmits signal light. The optical waveguide, for example, guides the wave of the light entering the light receiving element 111 or the light to be output from the light emitting element 112. The optical waveguide 130 has a core 130a at a center and cladding 130b of a refraction index lower than that of the core 130a and arranged around the core 130a. This causes the signal light inside the core 130a to be transmitted while being completely reflected at the interface of the core 130a and the cladding 130b. For the optical waveguide 130, a waveguide of polymer including, for example, epoxy resin and acrylate resin can be used. For the optical waveguide 130, an inexpensive waveguide that transmits multimode can be used but other waveguides than this may also be used.

The optical waveguide 130 has a mirror 133 formed at the position corresponding to the position at which the light receiving element 111 is arranged, below the light receiving element 111. The mirror 133 is formed by shaving the optical waveguide 130 by dicing or laser processing. The angle of inclination of the mirror 133 is, for example, 45 [degrees]. This enables the mirror 133 to bend the signal light transmitted within the optical waveguide 130 by 90 [degrees]. Thus, it is possible to bend the signal light transmitted from the optical waveguide 130 by 90 [degrees] and output the signal light to the light receiving element 111 as well as transmit the signal light output from the light emitting element 112 to the optical waveguide 130.

Figure 3:
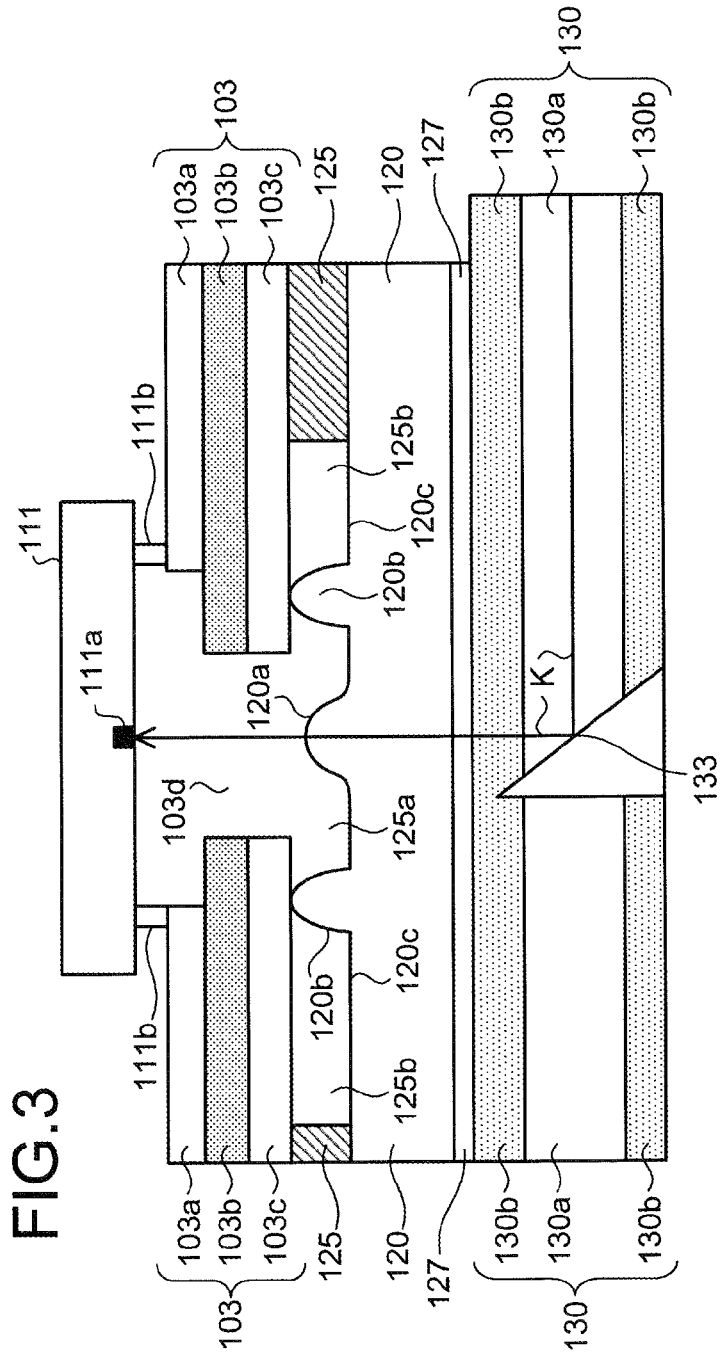
FIG. 3 is an enlarged partial cross-sectional view along A-A' depicted in FIG. 1.

FIG. 3 is an enlarged partial cross-sectional view along A-A' depicted in FIG. 1. As depicted in FIG. 3, the flexible board 103 has a part thereof hollowed out that corresponds to light path K along which the signal light is transmitted. The flexible board 103 has a core layer 103b, a signal electrode 103a, and a ground electrode 103c.

For the core layer 103b, for example, a material is used that has a low loss of the electrical signal at a high frequency and that is thin and transparent and, for example, polyimide is used. The core layer 103b is not limited to transparent materials and may be colored materials. If the material is a transparent material that can transmit the signal light, the core layer 103b may be one in which the part corresponding to light path K is not hollowed out (see FIG. 20). The signal electrode 103a is formed patterned, using a wiring conductor such as a copper foil, on one face of the core layer 103b.

The signal electrode 103a, which is not transparent, is wired so as to avoid light path K along which the signal light is transmitted. The ground electrode 103c is formed patterned, using the wiring conductor such as the copper foil, on the other face of the core layer 103b.

The light receiving element 111 has a light receiving part 111a and a terminal 111b. The light receiving part 111a is arranged to face the lens sheet 120 and receives the signal light transmitted by the lens sheet 120. The light receiving element 111 converts the received signal light to a signal current. The light receiving part 111a is formed, for example, in a circular shape. The terminal 111b is connected to the signal electrode 103a and transmits the signal current through the connected signal electrode 103a.

Likewise, the light emitting element 112 has a light emitting part (112a) and a terminal (112b), though not depicted. The light emitting part (112a) is arranged to face the lens sheet 120 and outputs the signal light toward the lens sheet 120. The light emitting part (112a) converts the input signal current to the signal light. The light emitting part (112a) is formed, for example, in the circular shape. The terminal (112b) is connected to the signal electrode 103a and transmits the signal current through the connected signal electrode 103a.

The bonding sheet 125 connects the flexible board 103 and the lens sheet 120. The bonding sheet 125 has an opening 125a formed at the position corresponding to light path K so that the signal light can be transmitted between the flexible board 103 and the lens sheet 120. In this embodiment, for the opening 125a, for example, an opening formed by cutting is used. There is a void 125b where the bonding sheet 125 is not disposed, between the flexible board 103 and the lens sheet 120.

The lens sheet 120 is a transparent member. For example, thermoplastic resin such as cycloolefin polymer (COP) and polycarbonate (PC) is used for the lens sheet 120. The lens sheet 120 has a lens 120a formed to condense light.

The lens 120a depicted in FIG. 3 is, for example, a convex lens of a predetermined height. The lens 120a is not limited to the convex lens and may be a concave lens. Around the lens 120a in the drawing, the lens sheet 120 has a convex part 120b formed that, for example, has a height equivalent to the thickness of the bonding sheet 125.

The convex part 120b is disposed at the position corresponding to the void 125b where the bonding sheet 125 is not disposed over the lens sheet 120 and at the position at which the convex part 120b abuts against the flexible board 103. Plural convex parts 120b are disposed at the positions surrounding the lens. This makes it possible to support such part of the flexible board 103 for which the bonding sheet 125 is not disposed from the lens sheet 120 side, reducing the warp of the flexible board 103 caused by the pressure of the heat sink 140.

While a convex part having the thickness equivalent to that of the bonding sheet 125 is used for the convex part 120b, the convex part 120b is not limited to this and may be a convex part that, for example, abuts against the flexible sheet to reduce the warp when the flexible board 103 is warped. Namely, the convex part 120b is not limited to the one having the thickness equivalent to that of the bonding sheet 125 and may be one having a thickness less than that of the bonding sheet 125.

The arrangement position of the convex part 120b may be the position directly below or inside (light path K side) the terminal 111b on which the pressure from the heat sink 140 acts or may be the positions symmetrical with respect to the lens 120a. Such arrangement positions make it possible to further reduce the warp of the flexible board 103.

The bonding layer 127 bonds the lens sheet 120 and the optical waveguide 130 together. A transparent material is used for the bonding layer 127.

An example will be described of dimensions of each part. The thickness (height direction of FIG. 3) of the light receiving element 111 is, for example, 200 [μm]. The thickness of the core layer 103b is, for example, 25 [μm] or less. The thickness of the signal electrode 103a and the ground electrode 103c is, for example, 20 [μm] or less each. The thickness of the bonding sheet 125 is, for example, 50 [μm].

The thickness of the lens sheet 120 is a total of the thickness of the part at which the lens 120a is formed, the thickness of the part at which the convex part 120b is formed, and the thickness of a flat part 120c at which neither the lens 120a nor the convex part 120b is formed. The thickness of the part at which the lens 120a is formed is, for example, 100 [μm] or less.

The thickness of the part at which the convex part 120b is formed is, for example, 100 [μm]. The thickness of the flat part 120c is, for example, 50 [μm]. The thickness of the bonding layer 127 is, for example, 10 [μm] or less. The thickness of the optical waveguide 130 is, for example, 100 [μm] or less. The light receiving diameter of the light receiving part 111a is, for example, on the order of 30 [μm].

The above configuration enables the optical module 100 to condense the light output from a separate optical module to the light receiving part 111a. The above configuration also enables the optical module 100 to output the signal light outgoing from the light emitting element 112 not depicted to the separate optical module through the optical waveguide 130.

One example will then be described of a fabrication process of the optical module according to the embodiment with reference to FIGS. 4 to 12. FIG. 4 is a process flowchart of one example of a fabrication process of the optical module, using the flip-chip bonder. As depicted in FIG. 4, in the fabrication process of the optical module, each of the following processes is performed, for example, by the flip-chip bonder.

The process of bonding the lens sheet 120 and the bonding sheet 125 that are prepared beforehand is performed (step S401). The lens sheet 120 to be used at step S401 is one in which the lens 120a and the convex part 120b are integrally formed. The bonding sheet 125 to be used at step S401 is one in which the opening 125a is largely hollowed out by the cutting.

The process is performed of bonding the flexible board 103 to the bonding sheet 125 of a formed body of the lens sheet 120 and the bonding sheet 125 bonded together at step S401 (step S402).

The process is performed of mounting the optical waveguide 130 to the lens sheet 120 of the formed body of the flexible board 103, the lens sheet 120, and the bonding sheet 125 that were integrated at step S402 (step S403).

At each of the process of alignment of the light receiving element 111 (light emitting element 112) and the lens 120a at step S402 and the process of alignment of the lens 120a and the optical waveguide 130 at step S403, high accuracy is required at the time of bonding. For example, for the alignment at these processes, the accuracy of, for example, 10 [μm] or less in misalignment is required to perform satisfactory optical coupling.

The process is performed of mounting the heat sink 140 to the flexible board 103 of the formed body of the flexible board 103, the lens sheet 120, the bonding sheet 125, and the optical waveguide 130 that were integrated at step S403 (step S404). Then, the fabrication process is finished.

At step S401 described above, since the lens sheet 120 with the convex part 120b formed thereon and the bonding sheet 125 with the opening 125a largely hollowed out by the cutting are used, the bonding sheet 125 and the lens sheet 120 can be bonded together even if the accurate alignment is not performed. This makes it possible to shorten the process time of step S401.

While, in this embodiment, firstly the lens sheet 120 and the bonding sheet 125 were bonded together and then the flexible board 103 was bonded thereto (see steps S401 and S402), the order of the process may be reversed. Namely, processing may be such that the bonding of the flexible board 103 and the bonding sheet 125 at step S402 is performed firstly and the bonding of the lens sheet 120 at step S401 is performed thereafter. In this case as well, in the process of the bonding of the flexible board 103 and the bonding sheet 125, the alignment accuracy can be lowered.

Figure 5A:
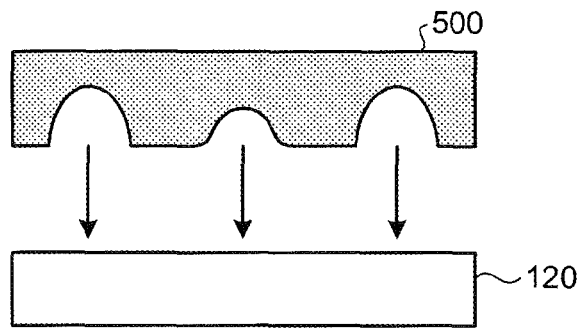
FIGS. 5A, 5B, and 5C are explanatory diagrams of one example of a fabrication process of a lens and a convex part.
Figure 5B:
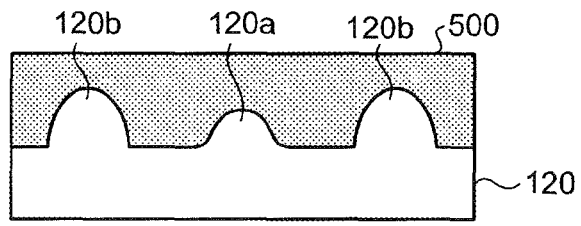
Figure 5C:
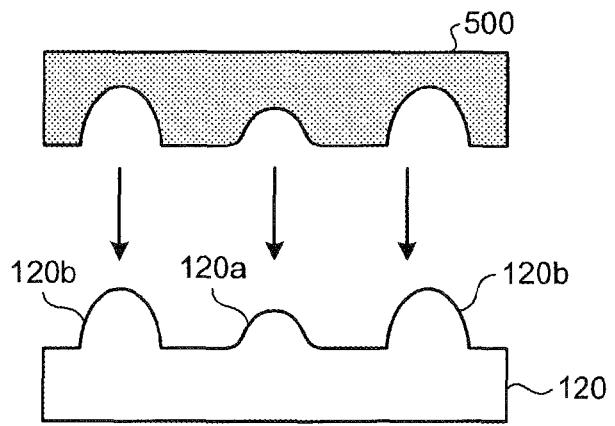

FIGS. 5A, 5B, and 5C are explanatory diagrams of one example of a fabrication process of the lens and the convex part. As depicted in FIGS. 5A, 5B, and 5C, a mold 500 is used in the fabrication of the lens 120a and the convex part 120b. The mold 500 is intended to shape the arc-shaped lens 120a and the arc-shaped convex part 120b within a predetermined area. The distance between the lens 120a and the convex part 120b is specified to be, for example, 100 [μm] or less. While details will be described later with reference to FIG. 6, the mold 500 can form eight lenses 120a and four convex parts 120b simultaneously.

As depicted in FIGS. 5A and 5B, the lens sheet 120 is pressurized against the mold 500 at high temperature. As depicted in FIG. 5C, by cooling the lens sheet 120 and pulling the lens sheet 120 away from the mold 500, the lens 120a and the convex part 120b are formed on the lens sheet 120.

By such a process, the convex part 120b as well as the lens 120a can be integrally formed in the process of forming the lens 120a. Namely, the convex part 120b can be formed without setting up a separate fabrication process. Since the convex part 120b is designed to have the same arc shape as that of the lens 120a, the mold is the easiest to fabricate and the cost can be reduced accordingly.

Figure 6:
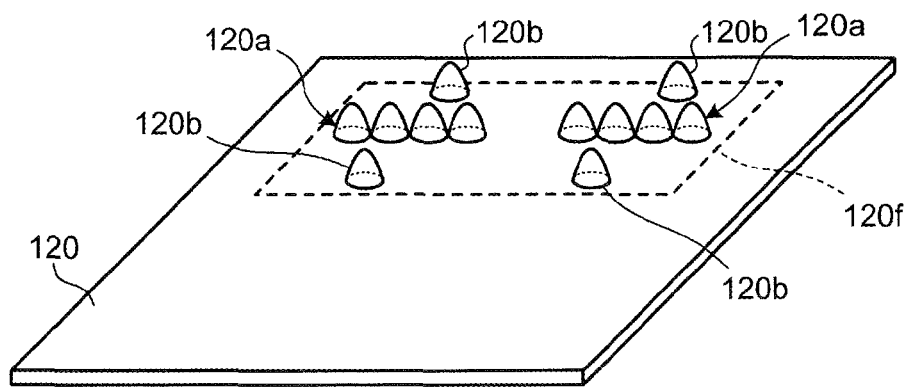
FIG. 6 is an explanatory diagram of one example of the lens and the convex part.

One example will be described of the lens and the convex part to be formed by the fabrication process depicted in FIGS. 5A, 5B, and 5C with reference to FIG. 6. FIG. 6 is an explanatory diagram of one example of the lens and the convex part. As depicted in FIG. 6, two sets of four consecutive lenses 120a (eight in total) and a pair of convex parts 120b disposed around each set of lenses 120a (four in total) are formed in a predetermined area 120f on the lens sheet 120.

The convex part 120b depicted here is one example. The number of the convex parts 120b is not limited to four but can be other numbers (see FIGS. 18 and 19) and the shape is not limited to the arc shape and may be a pillar shape (see FIG. 17). The way of the convex part 120b contacting with the flexible board 103 is not limited to a configuration of supporting by a point but can be a configuration of supporting by a line or a face (see FIGS. 13 to 16).

Figure 7A:
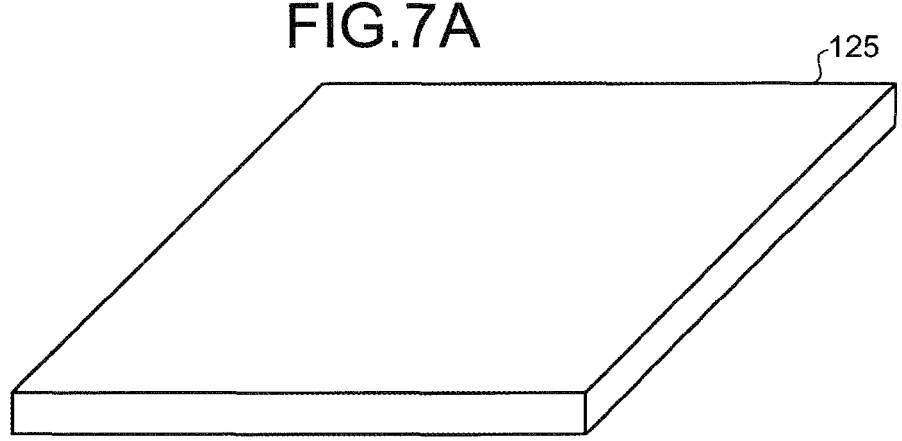
FIGS. 7A and 7B are an explanatory diagram of one example of a fabrication process of an opening of a bonding sheet.
Figure 7B:
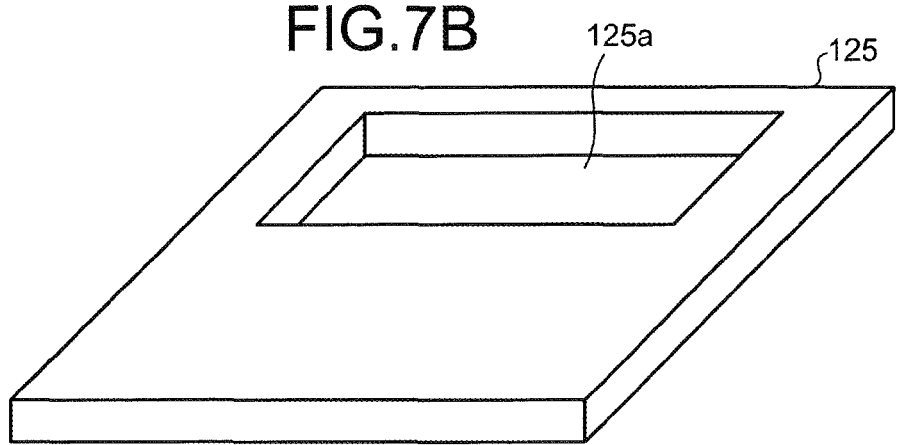

FIGS. 7A and 7B is an explanatory diagram of one example of a fabrication process of the opening of the bonding sheet. As depicted in FIGS. 7A and 7B, the opening 125a is formed in the bonding sheet 125. The opening 125a is formed by cutting such as punching out of the bonding sheet 125 by use of edged tools such as a pinnacle blade. The minimum size of the cut-out part is rather large, on the order of 0.5 to 1.0 [mm]. The opening 125a is formed at the position corresponding to the predetermined area 120f (see FIG. 6) in which the lenses 120a and the convex parts 120b are disposed on the lens sheet 120.

The opening 125a can also be formed with high accuracy by a technique of masking the part other than the opening 125a of the bonding sheet 125 and dipping the bonding sheet 125 in an etching solution. In contrast, since this embodiment permits the opening 125a to be formed roughly, the punching-out technique can be used and the time required for the formation of the opening 125a can be shortened.

In the case of using the bonding sheet 125 with the opening 125a formed by the punching-out, since the opening 125a is formed rather largely, the accuracy of bonding of the bonding sheet 125 and the lens sheet 120 can be lowered. This makes it possible to perform the process of bonding of the bonding sheet 125 and the lens sheet 120 (see step S401 of FIG. 4) within a short time.

Figure 8A:
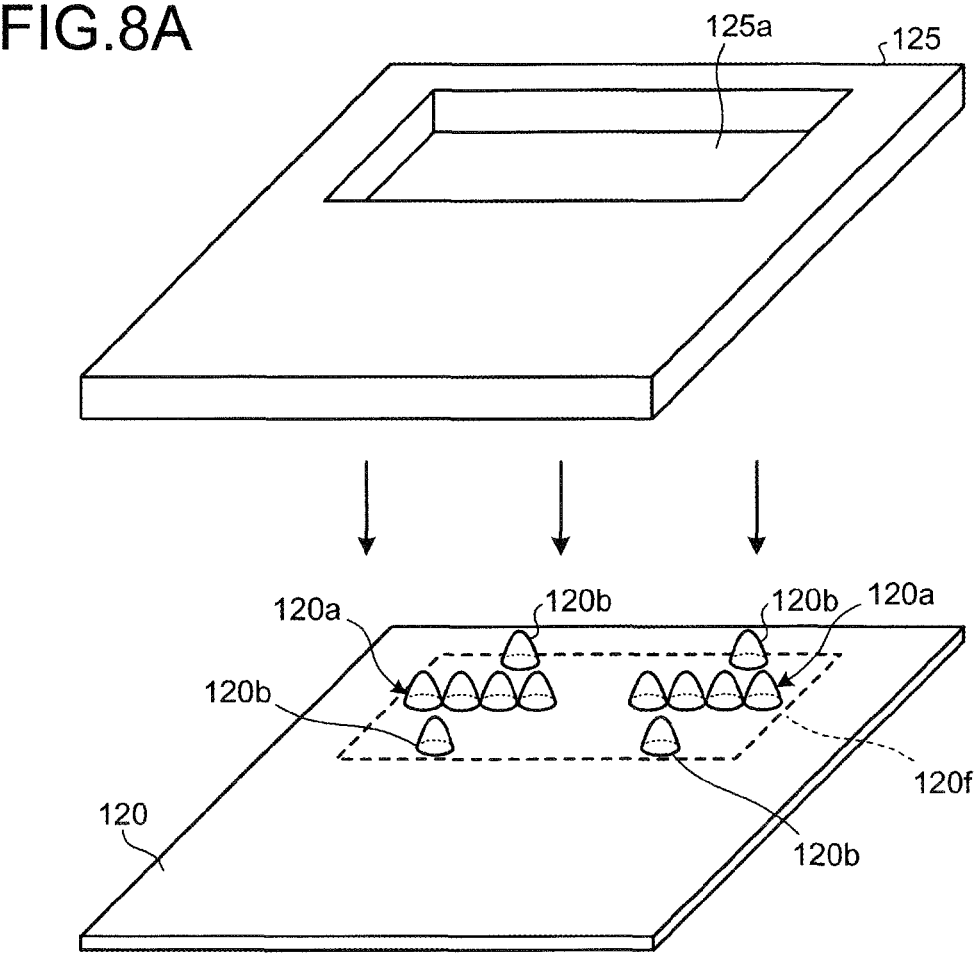
FIGS. 8A and 8B are explanatory diagrams of one example of a process of bonding of a lens sheet and the bonding sheet.
Figure 8B:
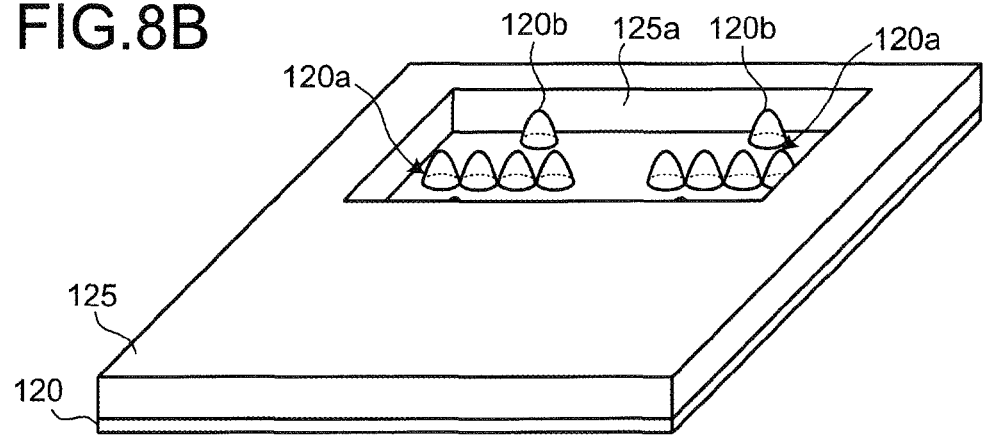

FIGS. 8A and 8B are explanatory diagrams of one example of a process of bonding of the lens sheet and the bonding sheet. The process depicted in FIGS. 8A and 8B is the process depicted at step S401 of FIG. 4. The process depicted in FIGS. 8A and 8B is the process of bonding together the lens sheet 120 formed in the process depicted in FIGS. 5A, 5B, and 5C and the bonding sheet 125 formed in the process depicted in FIGS. 7A and 7B.

For example, as depicted in FIGS. 8A and 8B, the lens sheet 120 and the bonding sheet 125 are bonded together in such a manner that the lenses 120a and the convex parts 120b will appear out of the opening 125a of the bonding sheet 125. Namely, the lens sheet 120 and the bonding sheet 125 are bonded together in such a manner that the bonding sheet 125 will not be layered over the lenses 120a or the convex parts 120b. The body formed by bonding of the lens sheet 120 and the bonding sheet 125 is used for the subsequent process (process at step S402 of FIG. 4).

In this embodiment, since the opening 125a is formed rather largely, the lens sheet 120 and the bonding sheet 125 can be bonded together without the high-accuracy alignment in the process of bonding together of the lens sheet 120 and the bonding sheet 125. This makes it possible to shorten the process time in the bonding together of the lens sheet 120 and the bonding sheet 125.

FIG. 9 is an explanatory diagram of one example of a process of bonding the flexible board. The process depicted in FIG. 9 is the process depicted at step S402 of FIG. 4. In the process depicted in FIG. 9, the body formed by bonding together of the lens sheet 120 and the bonding sheet 125 depicted in FIGS. 8A and 8B and the flexible board 103 are aligned and bonded together by the flip-chip bonder. The light receiving element 111, the light emitting element 112, the TIA 113, and the driver IC 114 have been flip-chip-mounted to the flexible board 103.

An electric wiring 103e is disposed on the flexible board 103. In this process, the alignment of the light receiving element 111 (light emitting element 112) and the lens 120a is performed with high accuracy. The body formed by bonding together of the lens sheet 120, the bonding sheet 125, and the flexible board 103 is used for the subsequent process (process at step S403 of FIG. 4).

Figure 10A:
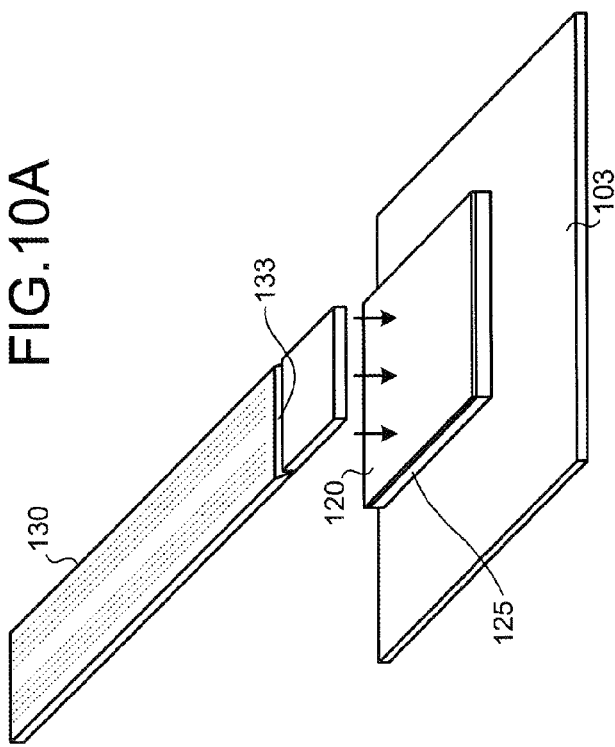
FIGS. 10A and 10B are explanatory diagrams of one example of a process of mounting an optical waveguide.
Figure 10B:
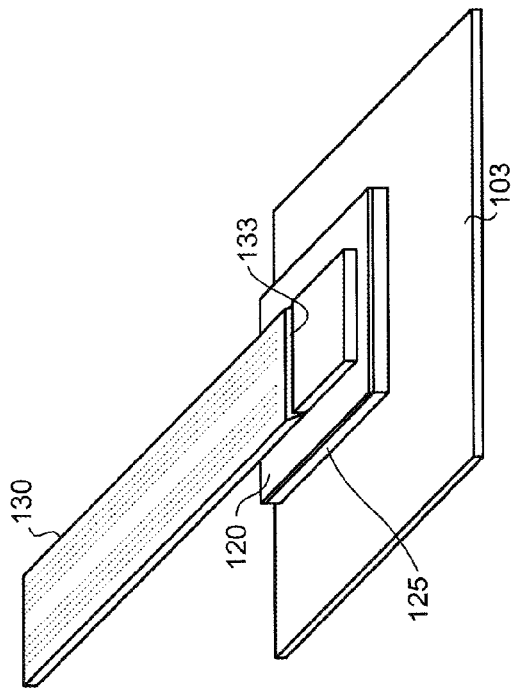

FIGS. 10A and 10B are explanatory diagrams of one example of a process of mounting the optical waveguide. The process depicted in FIGS. 10A and 10B is the process depicted at step S403 of FIG. 4. As depicted in FIGS. 10A and 10B, the optical waveguide 130 is mounted by the flip-chip bonder to the body formed by bonding together of the lens sheet 120, the bonding sheet 125, and the flexible board 103 depicted in FIG. 9.

In this process, the alignment of the lens 120a and the optical waveguide 130 is performed with high accuracy. The formed body including the lens sheet 120, the bonding sheet 125, the flexible board 103, and the optical waveguide 130 is used for the subsequent step (process at step S404 of FIG. 4).

FIGS. 11A and 11B are explanatory diagrams of one example of a process of mounting the heat sink. The process depicted in FIGS. 11A and 11B is the process depicted at step S404 of FIG. 4. In the process depicted in FIGS. 11A and 11B, as depicted in FIG. 11A, the electric wiring 103e is connected to the electric connector 102. As depicted in FIG. 11B, from over the connected flexible board 103, the heat sink 140 to cool the light receiving element 111 and the light emitting element 112 is mounted to the flexible board 103 by way of the heat dissipating sheet 141. For example, the heat sink 140 is mounted to the flexible board 103 by clamps, screws, etc., not depicted.

Figure 12:
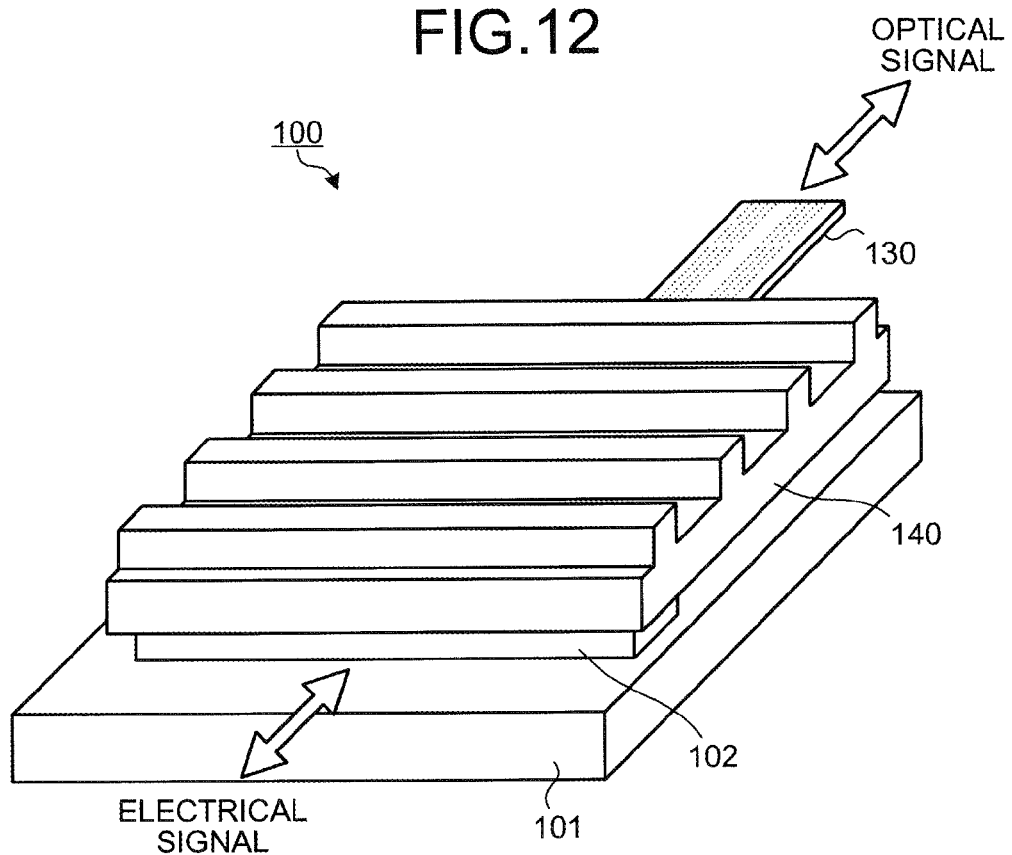
FIG. 12 is an explanatory diagram of one example of a fabricated optical module.

FIG. 12 is an explanatory diagram of one example of a fabricated optical module. As depicted in FIG. 12, in the optical module 100, the heat sink 140 is mounted and is held in such a state as to pressurize the flexible board 103 by clamps, screws, etc., not depicted. The optical module 100 is arranged, for example, on a server board and is used as a device to convert the electrical signal to the light signal or convert the light signal to the electrical signal.

As described above, in this embodiment, the disposition of the convex part 120b on the lens sheet 120 makes it possible to reduce the warp, caused by the pressure of the heat sink 140, of such part of the flexible board 103 that corresponds to the void 125b. This makes it possible to reduce the misalignment of the light receiving element 111 with respect to the lens 120a. For example, this can reduce the displacement of the light receiving element 111 in the height direction (direction in which the convex part 120b protrudes), the tilt of the light receiving element 111, and the horizontal displacement of the light receiving element 111 with respect to the lens. Therefore, an optical coupling loss can be reduced.

Since the convex part 120b can reduce the warp of the flexible board 103, the opening 125a can be formed rather largely in the process of forming the opening 125a of the bonding sheet 125 and the process time can be shortened in the process of forming the opening 125a.

With the use of the bonding sheet 125 having the opening 125a formed rather largely, the opening 125a can be caused to come to the position of the lens 120a even if the accuracy is lowered of the bonding of the bonding sheet 125 and the lens sheet 120. This makes it possible to lower the accuracy of the bonding of the bonding sheet 125 and the lens sheet 120, shortening the process time at the time of the bonding of the bonding sheet 125 and the lens sheet 120. For this reason, the time consumed for the fabrication of the optical module 100 can be shortened.

Since this embodiment uses the lens sheet 120 with the lens 120a and the convex part 120b integrally formed, it is made possible to make the lens 120a and the convex part 120b in the same process. Therefore, the convex part 120b can be formed without adding a separate process for making the convex part 120b. This makes it possible to make the convex part 120b while suppressing increases in the time consumed for the fabrication of the optical module 100.

Thus, according to this embodiment, the reduction of the optical coupling loss as well as the shortening of the fabrication time can be achieved.

FIGS. 13A and 13B are explanatory diagrams of variation 1 of the embodiment. In FIGS. 13A and 13B, the same components as those described in the above embodiment are given the same reference numerals used above, and the description thereof is omitted. Variation 1 differs from the above embodiment in the shape of the convex part 120b. As depicted in FIGS. 13A and 13B, the planar convex part 120b is formed on the lens sheet 120. The convex part 120b is thicker than the flat part 120c and is formed by the surface protruding above the flat part 120c.

From the view-point of effectively reducing the warp of the flexible board 103 around the lens 120a, the convex part 120b may be arranged, for example, in a doughnut shape to surround the lens 120a. The convex part 120b is disposed at the position corresponding to the void 125b where the bonding sheet 125 is not disposed over the lens sheet 120 and at the position at which the convex part 120b abuts against the flexible board 103. This makes it possible to support such part of the flexible board 103 at which the bonding sheet 125 is not disposed from the lens sheet 120 side, reducing the warp of the flexible board 103 caused by the pressure of the heat sink 140.

The lens 120a is disposed on the convex part 120b, using the upper surface of the convex part 120b formed in the planar state as a reference plane serving as a reference in the height direction. The distance between the lens 120a and the light receiving element 111 is set depending on the light receiving element to be used and a target focal spot size. For this reason, in variation 1, the lens 120a can be disposed close to the light receiving element 111 as compared with the case of disposing the lens 120a on the basis of the flat part 120c as in the above embodiment.

Therefore, according to variation 1, it is made possible to set the distance short between the lens 120a and the light receiving element 111. Variation 1 makes it possible to expand the area supporting from the lens sheet 120 side such part of the flexible board 103 that corresponds to the void 125b, effectively reducing the warp of the flexible board 103. This makes it possible to reduce the misalignment of light receiving element 111 with respect to the lens 120a.

FIGS. 14A and 14B are explanatory diagrams of variation 2 of the embodiment. In FIGS. 14A and 14B, the same components as those described in the above embodiment or variation 1 are given the same reference numerals used above, and the description thereof is omitted. Variation 2 differs from variation 1 in the lens 120a.

As depicted in FIGS. 14A and 14B, the lens 120a is disposed on a reference surface 120d higher than the convex part 120b. Variation 2 enables the lens 120a to be disposed close to the light receiving element 111, as compared with variation 1. Therefore, variation 2 makes it possible to expand the area supporting from the lens sheet 120 side, a part of the flexible board 103 that corresponds to the void 125b, effectively reducing the warp of the flexible board 103. This makes it possible to set the distance shorter between the lens 120a and the light receiving element 111 while reducing the misalignment of the light receiving element 111 with respect to the lens 120a.

While, in variation 2, the convex part 120b is specified to be in the planar state and thicker than the flat part 120c, the convex part 120b is not limited to this and may be the arc-shaped convex part disposed on the flat part 120c as depicted in the above embodiment. In this case, configuration may be such that, continuous with the flat part 120c, the reference surface 120d is disposed to be is higher than the ark-shaped convex part 120b and on the reference surface 120d, the lens 120a will be disposed.

FIGS. 15A and 15B are explanatory diagrams of variation 3 of the embodiment. In FIGS. 15A and 15B, the same components as those described in the above embodiment or variations 1 and 2 are given the same reference numerals used above, and description thereof is omitted. Variation 3 differs from variation 2 in the height of the reference surface 120d of the lens 120a.

As depicted in FIGS. 15A and 15B, the lens 120a is disposed on the reference surface 120d that is lower than the convex part 120b and is also lower than the flat part 120c.

Variation 3 enables the lens 120a to be disposed away from the light receiving element 111, as compared with the embodiment and variation 1. Therefore, variation 3 makes it possible to expand the area supporting from the lens sheet 120 side such part of the flexible board 103 that corresponds to the void 125b, effectively reducing the warp of the flexible board 103. This makes it possible to set the distance longer between the lens 120a and the light receiving element 111 while reducing the misalignment of the light receiving element 111 with respect to the lens 120a.

While, in variation 3, the convex part 120b is specified to be in the planar state and thicker than the flat part 120c, the convex part 120b is not limited to this and may be the arc-shaped convex part disposed on the flat part 120c as depicted in the above embodiment. In this case, configuration may be such that, continuous with the flat part 120c, the reference surface 120d is disposed to be lower than the flat part 120c and on the reference surface 120d, the lens 120a is disposed.

Thus, according to variations 1 to 3, the position of the lens 120a can be set freely depending on an optical element to be used and the target focal spot size.

FIGS. 16A and 16B are explanatory diagrams of variation 4 of the embodiment. In FIGS. 16A and 16B, the same components as those described in the above embodiment are given the same reference numerals used above, and the description thereof is omitted. Variation 4 differs from the embodiment in that the convex part 120b abuts against the core layer 103b.

As depicted in FIGS. 16A and 16B, the flexible board 103 has a non-formed part where the ground electrode 103c is not formed. Thus, when there is the non-formed part 103d, the thickness of the convex part 120b formed on the lens sheet 120 may be determined as a total thickness of the thickness of the flat part 120c, the thickness of the bonding sheet 125, and the thickness of the ground electrode 103c.

This makes it possible to cause the convex part 120b to abut against the core layer 103b and to support from the lens sheet 120 side such part of the flexible board 103 that corresponds to the void 125b where the bonding sheet 125 is not disposed. Therefore, it is made possible to reduce the warp of the flexible board 103 caused by the pressure of the heat sink 140 and to reduce the misalignment of the light receiving element 111 with respect to the lens 120a.

Figure 17:
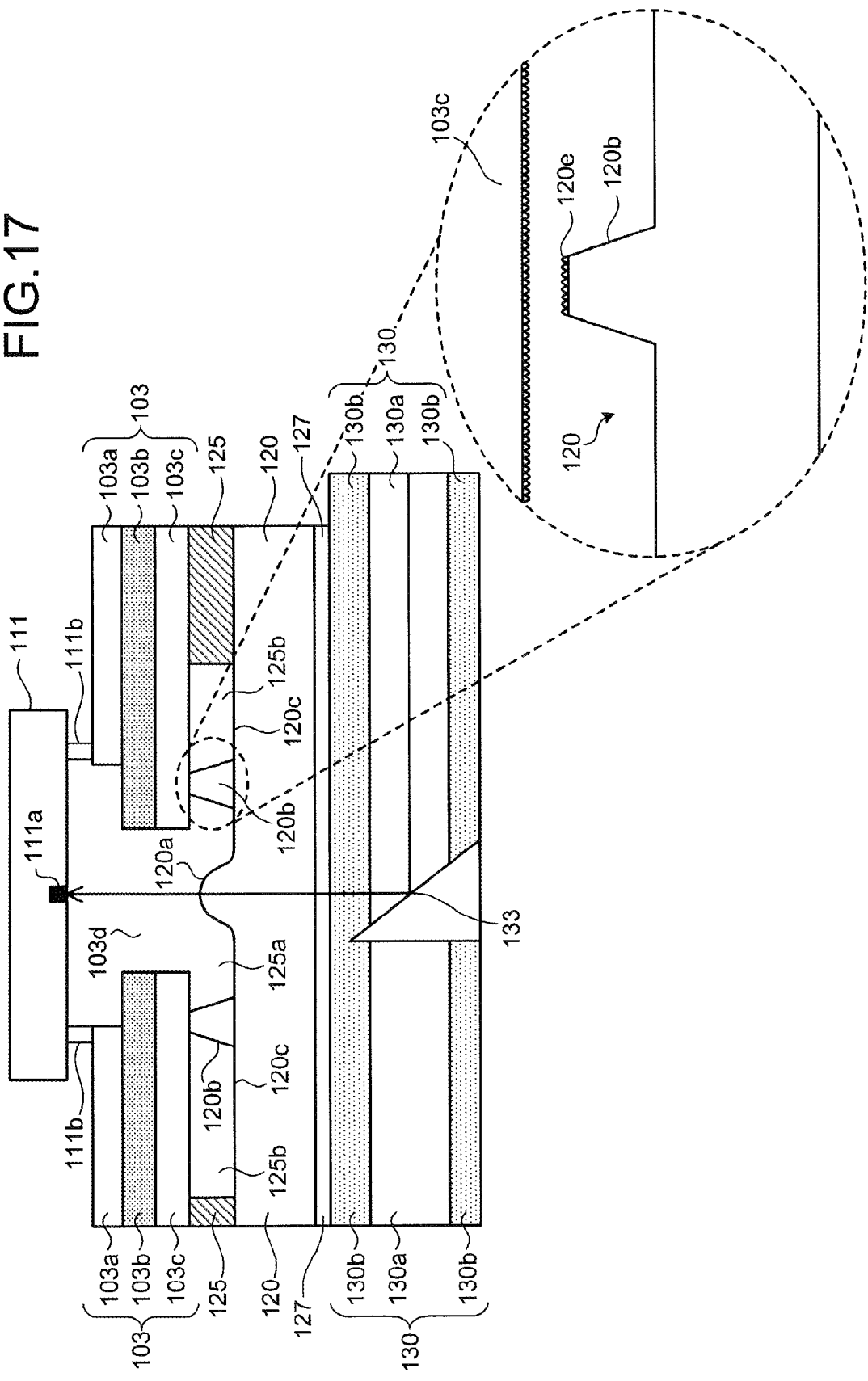
FIG. 17 is an explanatory diagram of variation 5 of the embodiment.

FIG. 17 is an explanatory diagram of variation 5 of the embodiment. In FIG. 17, the same components as those described in the above embodiment are given the same reference numerals used above, and the description thereof is omitted. Variation 5 differs from the embodiment in the shape of such part of the convex part 120b that abuts against the flexible board 103.

As depicted in FIG. 17, the convex part 120b is formed in a pillar shape. An anti-slip part 120e is formed on the part (end) of the convex part 120b that abuts against the ground electrode 103c. The anti-slip part 120e is simply a knurled concavo-convex pattern formed on the part (end) of the convex part 120b that abuts against the ground electrode 103c. With the anti-slip part 120e shaped in the mold 500 that fabricates the convex part 120b, the anti-slip part 120e can be mold-formed simultaneously with the convex part 120b (see FIGS. 5A, 5B, and 5C).

Such a configuration can increase the frictional force by the anti-slip part 120e of the convex part 120b and can reduce the displacement of the light receiving element 111 (light emitting element 112). As depicted in FIG. 17, the surface of the ground electrode 103c has unevenness formed by the copper foil and has an anti-slip function due to the copper foil. For this reason, by causing the surface of the ground electrode 103c and the anti-slip part 120e to abut against each other, the frictional force can be further heightened.

Figure 18:
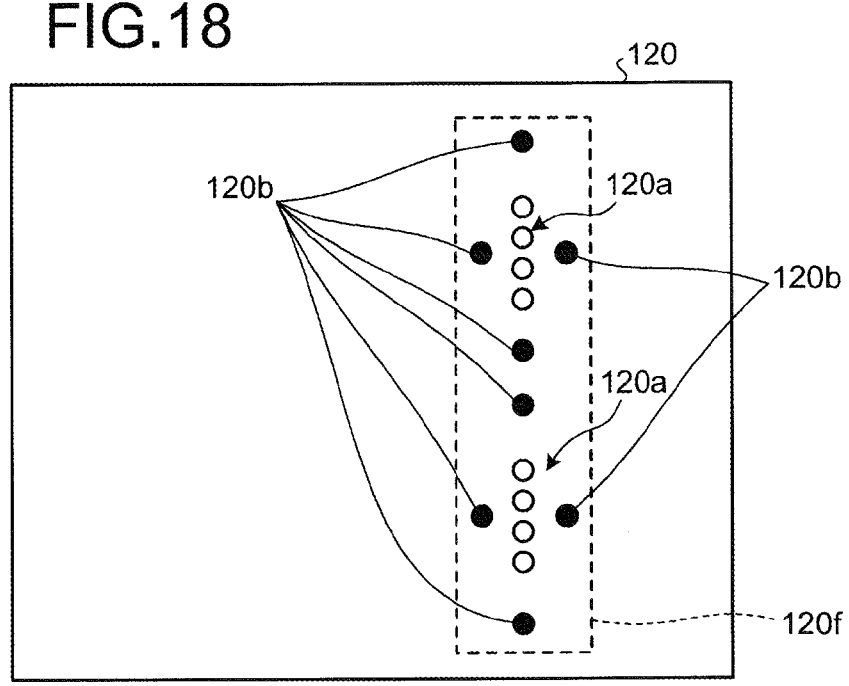
FIG. 18 is an explanatory diagram of variation 6 of the embodiment.

FIG. 18 is an explanatory diagram of variation 6 of the embodiment. In FIG. 18, the same components as those described in the above embodiment are given the same reference numerals used above, and the description thereof is omitted. Variation 6 differs from the embodiment in the arrangement location and the number of the convex parts 120b. Though both of the lens 120a and the convex part 120b are transparent, the convex part 120b is indicated by a black circle for convenience of description in FIG. 18.

As depicted in FIG. 18, within the predetermined area 120f on the lens sheet 120, the convex part 120b is formed at each of four corners of a sequence of the lenses 120a (total eight convex parts 120b). Thus, in variation 6, the number of the convex parts 120b is larger by four than in the above embodiment. This can increase the number of places at which the part of the flexible board 103 where the bonding sheet 125 is not disposed is supported from the lens sheet 120 side. This makes it possible to reduce the warp of the flexible board 103 and to reduce the misalignment of the light receiving element 111 with respect to the lens 120a.

Figure 19:
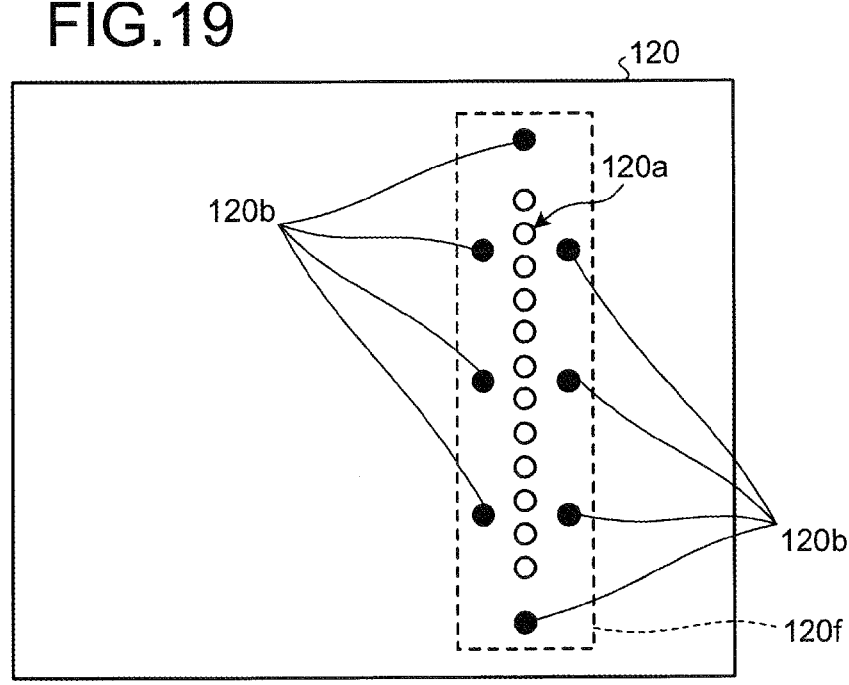
FIG. 19 is an explanatory diagram of variation 7 of the embodiment.

FIG. 19 is an explanatory diagram of variation 7 of the embodiment. In FIG. 19, the same components as those described in the above embodiment or variation 6 are given the same reference numerals used above, and the description thereof is omitted. Variation 7 differs from variation 6 in the arrangement location of the lens 120a and the convex part 120b.

As depicted in FIG. 19, 12 consecutive lenses 120a and eight convex parts 120b around them are formed within the predetermined area 120f on the lens sheet 120. The lens 120a is disposed depending on the number and the location of the optical element to be used (light receiving part 111a of light receiving element 111 and light emitting part 112a of light emitting element 112).

Variation 7 depicts the lens sheet 120 to be used when 12 consecutive optical elements are disposed. With the use of such a lens sheet 120, even when the 12 consecutively disposed optical elements are used, such part of the flexible board 103 that corresponds to the void 125b can be supported from the lens sheet 120 side by the convex parts 120b. Therefore, it is made possible to effectively reduce the warp of the flexible board 103 caused by the pressure of the heat sink 140 and to reduce the misalignment of the light receiving element 111 with respect to the lens 120a.

Figure 20:
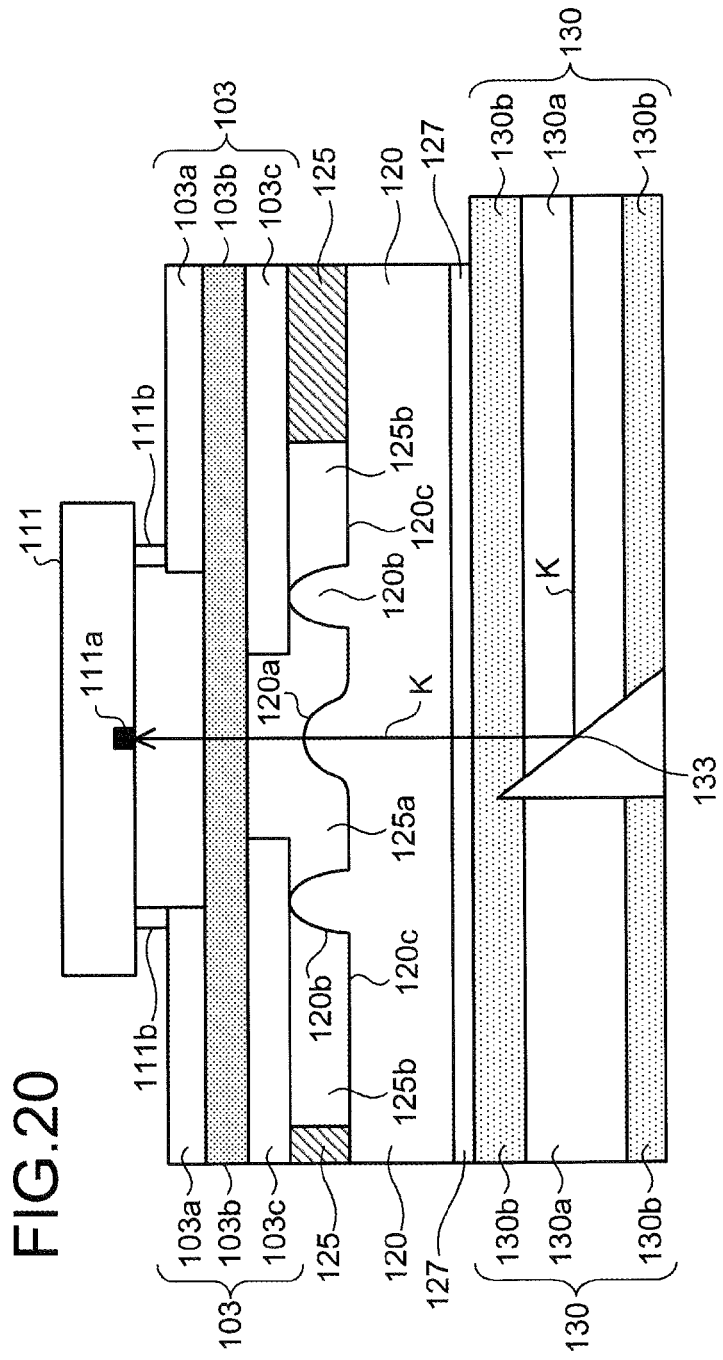
FIG. 20 is an explanatory diagram of variation 8 of the embodiment.

FIG. 20 is an explanatory diagram of variation 8 of the embodiment. In FIG. 20, the same components as those described in the above embodiment are given the same reference numerals used above, and the description thereof is omitted. Variation 8 differs from the above embodiment in the shape of the core layer 103b of the flexible board 103. The core layer 103b is a transparent member and is not the one having a hollowed-out part at the position corresponding to light path K. The core layer 103b transmits the signal light of light path K.

Even the configuration using the core layer 103b of variation 8 can have the warp of the flexible board 103 caused by the pressure of the heat sink 140 at the void 125b where the bonding sheet 125 is not disposed. In the configuration using the core layer 103b according to variation 8, if the warp is caused to the flexible board 103, the core layer 103b becomes a point of reflection and the optical coupling loss becomes large.

For this reason, by using the lens sheet 120 with the convex part 120b disposed thereon, it is made possible to support such part of the flexible board 103 that corresponds to the void 125b from the lens sheet 120 side, to reduce the warp of the flexible board 103, and to reduce the misalignment of the light receiving element 111 with respect to the lens 120a.

Figure 21:
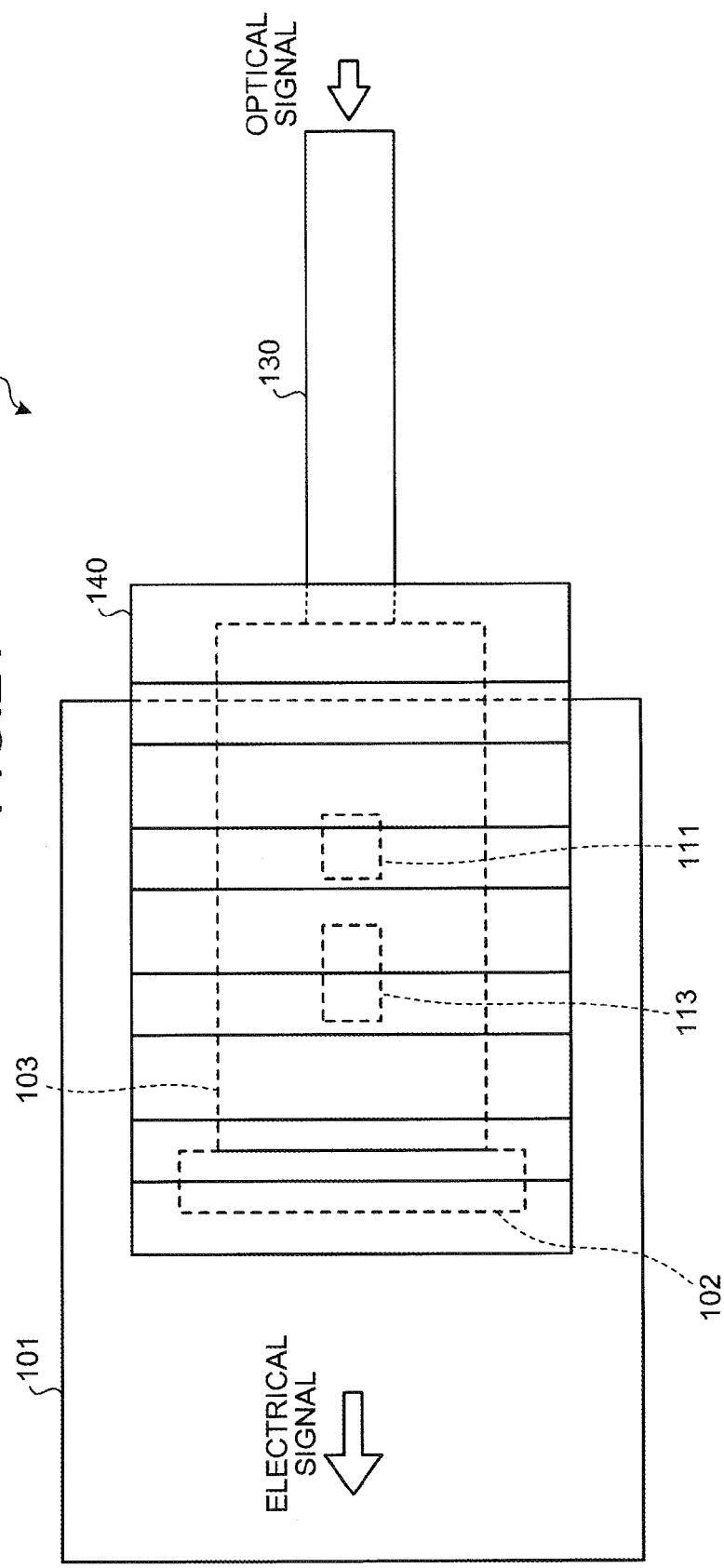
FIG. 21 is an explanatory diagram of variation 9 of the embodiment.

FIG. 21 is an explanatory diagram of variation 9 of the embodiment. In FIG. 21, the same components as those described in the above embodiment are given the same reference numerals used above, and the description thereof is omitted. Variation 9 differs from the above embodiment in that neither the light emitting element 112 nor the driver IC 114 is disposed.

As depicted in FIG. 21, the light receiving element 111 and the TIA 113 are mounted on the flexible board 103 of the optical module 100. The light receiving element 111 is pressurized by the heat sink 140. On the upper surface of the light receiving element 111, the heat sink 140 is disposed, with the heat dissipating sheet 141 sandwiched in between.

The heat sink 140 cools the light receiving element 111 by way of the heat dissipating sheet 141. The heat sink 140, for example, by being fastened by clamps, screws, etc., to the flexible board 103, is held in such a state as to pressurize the light receiving element 111. Such a configuration enables the optical module to perform the optoelectric conversion of the light signal to the electrical signal.

With respect to the optical module 100 depicted in variation 9 as well, by disposing the convex part 120b on the lens sheet 120, it is made possible to reduce the warp of the flexible board 103 caused by the pressure of the heat sink 140 and to reduce the misalignment of the light receiving element 111 with respect to the lens 120a.

Figure 22:
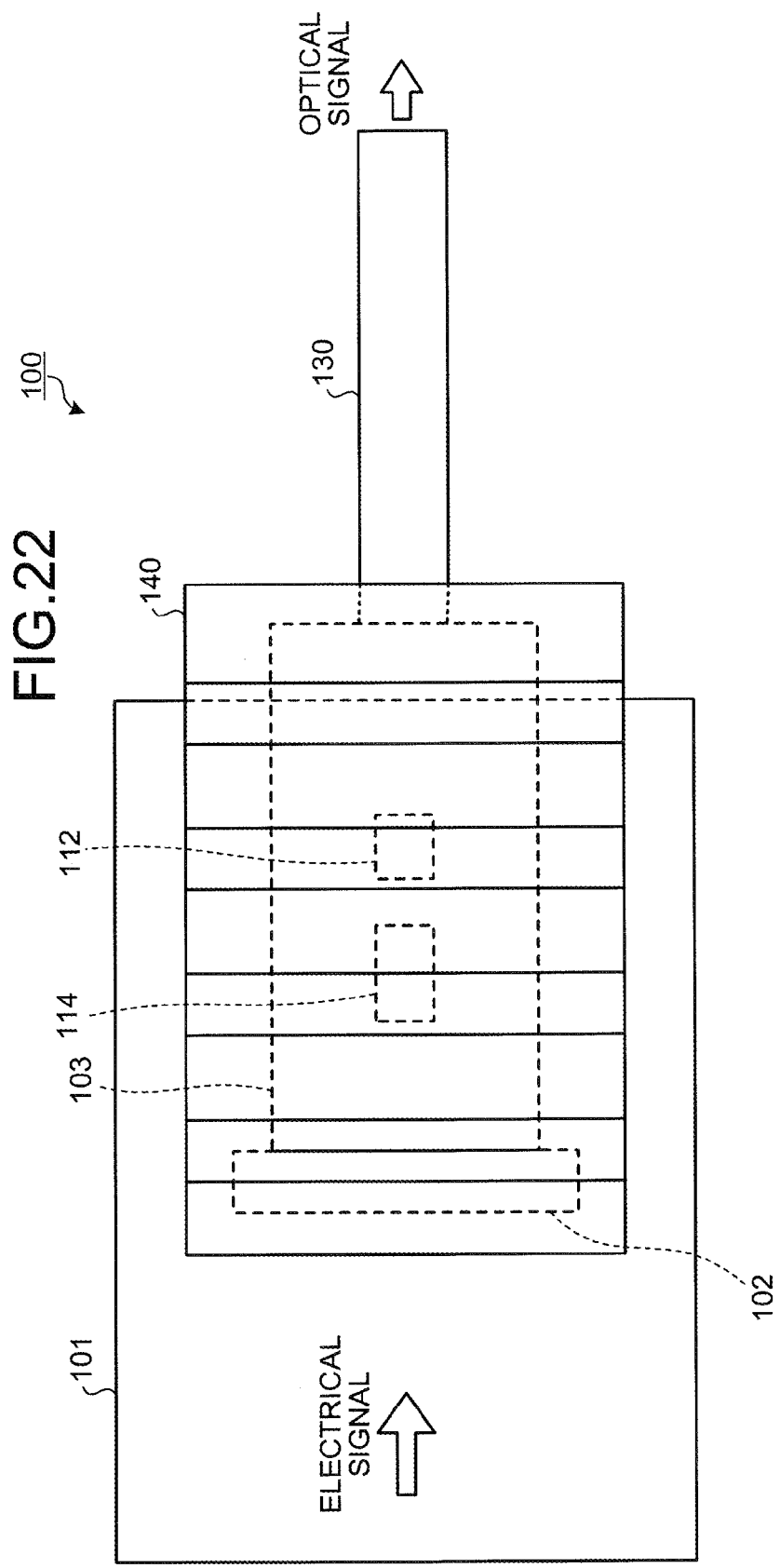
FIG. 22 is an explanatory diagram of variation 10 of the embodiment.

FIG. 22 is an explanatory diagram of variation 10 of the embodiment. In FIG. 22, the same components as those described in the above embodiment are given the same reference numerals, and the description thereof is omitted. The variation 10 differs from the above embodiment in that neither the light receiving element 111 nor the TIA 113 is disposed.

As depicted in FIG. 22, the light emitting element 112 and the driver IC 114 are mounted on the flexible board 103 of the optical module 100. The light emitting element 112 is pressurized by the heat sink 140. On the upper surface of the light emitting element 112, the heat sink 140 is disposed, with the heat dissipating sheet 141 sandwiched in between.

The heat sink 140 cools the light emitting element 112 by way of the heat dissipating sheet 141. The heat sink 140, for example, by being fastened by clamps, screws, etc., to the flexible board 103, is held in such a state as to pressurize the light emitting element 112. Such a configuration enables the optical module to perform the optoelectric conversion of the electrical signal to the light signal.

With respect to the optical module 100 depicted in variation 10 as well, by disposing the convex part 120b on the lens sheet 120, it is made possible to reduce the warp of the flexible board 103 caused by the pressure of the heat sink 140 and to reduce the misalignment of the light emitting element 112 with respect to the lens 120a.

Figure 23:
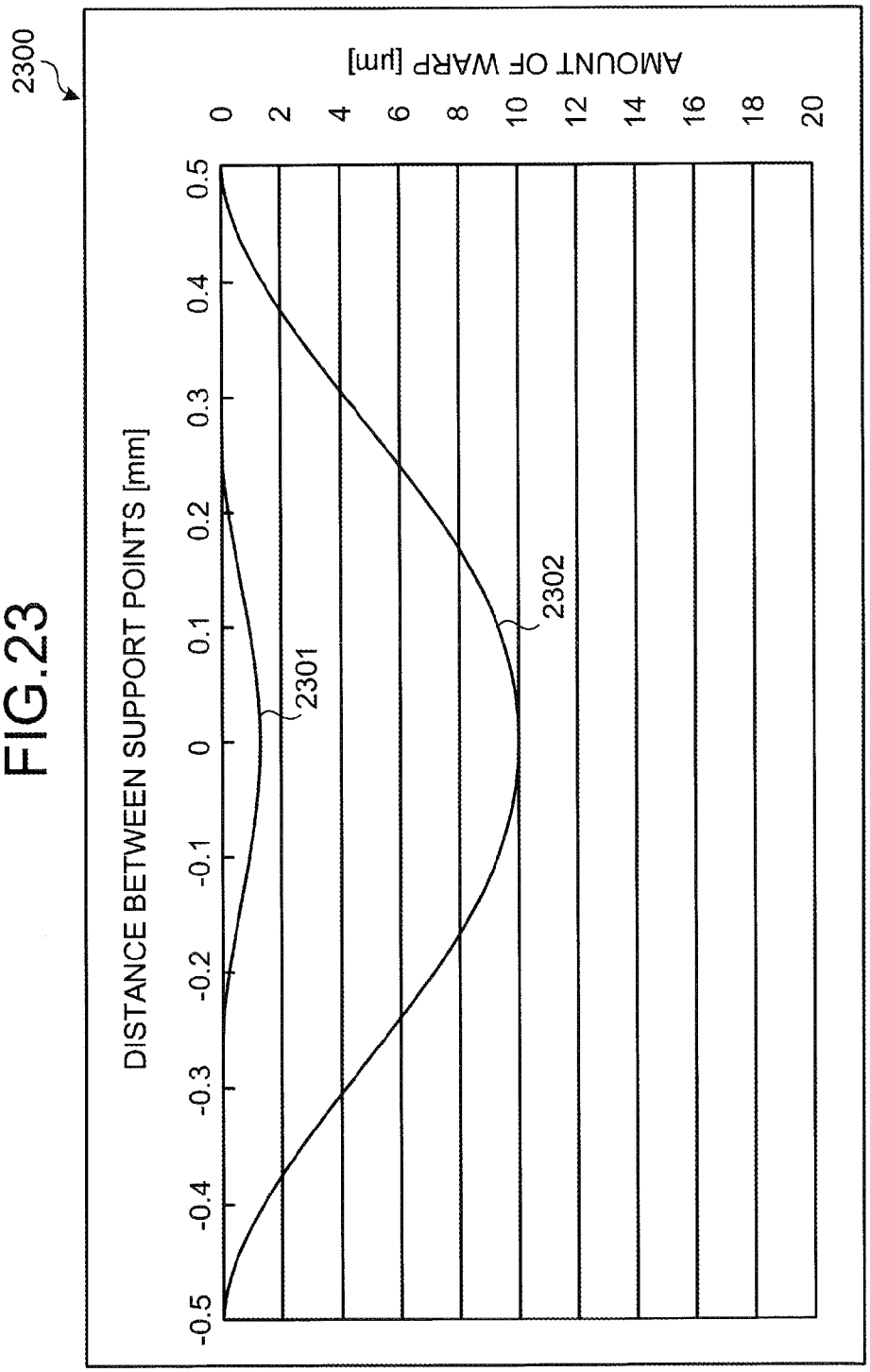
FIG. 23 is an explanatory diagram of one example of the warp of the flexible board.

FIG. 23 is an explanatory diagram of one example of the warp of the flexible board. As depicted in FIG. 23, graph 2300 has the vertical axis representing the amount of warp [μm] of the flexible board 103 and the horizontal axis representing the distance [mm] between support points supporting the flexible board 103 from downward.

Figure 24:
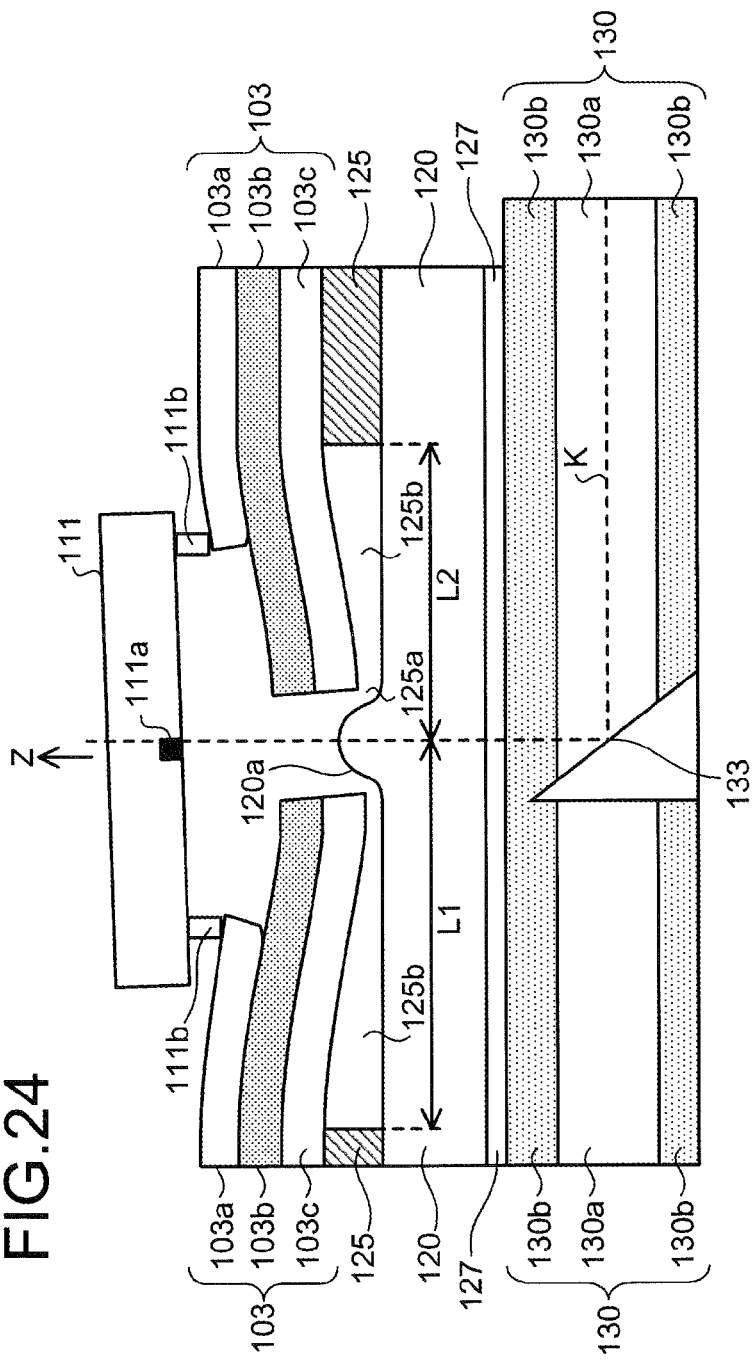
FIG. 24 is an explanatory diagram of one example for reference of a configuration of not disposing the convex part on the lens sheet.

Curve 2302 indicates for reference the amount of warp of the flexible board 103 having the configuration of not disposing the convex part 120b (see FIG. 24). The distance between the support points depicted in curve 2302 corresponds to the distance between the bonding sheets 125 disposed opposite to each other across light path K (see FIG. 24). As depicted in curve 2302, in the configuration of not disposing the convex part 120b, the distance between the support points (between bonding sheets 125) is on the order of 1 [mm] and the amount of warp of the flexible board 103 is on the order of 10 [μm].

On the other hand, curve 2301 indicates the amount of warp of the flexible board 103 having the configuration of disposing the convex part 120b depicted in the embodiment. The distance between the support points depicted in curve 2301 corresponds to the distance between the convex parts 120b disposed opposite to each other across light path K (see FIG. 3). As depicted in curve 2301, the distance between the support points (between convex parts 120b) is on the order of 0.4 [mm] and the amount of warp of the flexible board 103 is on the order of 1 [μm].

As is apparent from the comparison of curve 2301 and curve 2302, by disposing the convex part 120b, it is made possible to decrease the distance between the support points supporting the flexible board 103 from downward, to reduce the warp of the flexible board 103, and to reduce the misalignment of the light receiving element 111 with respect to the lens 120a.

FIG. 24 is an explanatory diagram of one example for reference of a configuration of not disposing the convex part on the lens sheet. As depicted in FIG. 24, if the convex part 120b is not disposed, the flexible board 103 is caused to warp by the pressure of the heat sink 140 against the light receiving element 111. In the drawing, the lengths L1 and L2, based on light path K, of the left and right voids 125b where the bonding sheet is not disposed can become L1≠L2. In this case, if the warp of the flexible board 103 causes the light receiving element 111 to be inclined or to be displaced horizontally with respect to the lens, the optical coupling loss becomes prominent as compared with the case of displacement only in the Z direction in the drawing.

By contrast, when the convex part 120b is disposed, it is made possible to decrease the distance between the support points supporting the flexible board 103 from downward and to reduce the warp of the flexible board 103. Therefore, even in the case of L1≠L2 described above, it is made possible to suppress the inclination of the light receiving element 111 or the horizontal displacement of the light receiving element 111 with respect to the lens and to reduce the optical coupling loss.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:
1. An optical module comprising:
   a flexible printed circuit board on which at least any one among a light receiving element and a light emitting element is mounted face-down as an optical element, and that has a part that when the light receiving element is mounted, transmits incoming light to the light receiving element and when the light emitting element is mounted, transmits outgoing light from the light emitting element;

a lens member that is disposed on the flexible printed circuit board, on a surface on which the optical element is not mounted, the lens member is integrally formed to have within a predetermined area, a lens that transmits at least any one among the incoming light and the outgoing light, and a convex part that abuts the flexible printed circuit board;

a bonding member that is disposed in an area other than the predetermined area, between the flexible printed circuit board and the lens member, and that bonds the flexible printed circuit board and the lens member; and a cooling member that is disposed in a state that applies pressure to the optical element toward the flexible printed circuit board and cools the optical element, wherein a terminal of the optical element is disposed above the predetermined area and an arrangement position of the convex part is a position directly below or inside the terminal toward a light path of the optical element.

2. The optical module according to claim 1, wherein the lens member has a plurality of convex parts that abut the flexible printed circuit board within the predetermined area.

3. The optical module according to claim 2, wherein the convex parts are disposed at positions surrounding the lens.

4. The optical module according to claim 1, wherein the bonding member is a bonding sheet from which a portion that corresponds to the predetermined area is cut out.

5. The optical module according to claim 1, wherein the lens member is formed by molding and includes the lens and the convex part.

6. The optical module according to claim 5, wherein the convex part is formed in an arc shape.

7. The optical module according to claim 1, wherein the convex part has unevenness on a surface abutting the flexible printed circuit board.

8. The optical module according to claim 1, wherein the flexible printed circuit board is a printed circuit board using a transparent substrate and transmits at least any one among the incoming light and the outgoing light.

9. The optical module according to claim 1, wherein the flexible printed circuit board has an opening that transmits at least any one among the incoming light and the outgoing light.

10. An optical module fabrication method comprising:

bonding to a lens member integrally formed to have a lens and a convex part within a predetermined area, a bonding member that is a bonding sheet from which a portion that corresponds to the predetermined area is cut out;

bonding the bonding member to a surface of a flexible printed circuit board to which at least any one among a light receiving element and a light emitting element is mounted face-down as an optical element, the bonding member being bonded on a side on which the optical element is not mounted, in a positional relationship such that the convex part abuts the flexible printed circuit board and the lens transmits at least any one among incoming light to the light receiving element and outgoing light from the light emitting element; and disposing on the optical element in a state that applies pressure to the optical element toward the flexible printed circuit board, a cooling member that cools the optical element, wherein a terminal of the optical element is disposed above the predetermined area and an arrangement position of the convex part is a position directly below or inside the terminal toward a light path of the optical element.

\* \* \* \* \*